United States Patent
Xia et al.

(10) Patent No.: US 9,966,169 B1
(45) Date of Patent: May 8, 2018

(54) INTEGRATED DOWNHOLE ELECTRICAL FEEDTHROUGH PACKAGES

(71) Applicant: Pacific Aerospace & Electronics, Inc., Wenatchee, WA (US)

(72) Inventors: Hua Xia, Huffman, TX (US); Nelson Settles, East Wenatchee, WA (US); Tucker Havekost, Leavenworth, WA (US); Daniel Brown, Wenatchee, WA (US)

(73) Assignee: PA&E, HERMETIC SOLUTIONS GROUP, LLC, Wenatchee, WA (US)

( * ) Notice: Subject to any disclaimer, the term of this patent is extended or adjusted under 35 U.S.C. 154(b) by 0 days. days.

(21) Appl. No.: 15/488,665

(22) Filed: Apr. 17, 2017

(51) Int. Cl.
*H02G 3/22* (2006.01)
*H01B 17/30* (2006.01)
*H02G 9/06* (2006.01)
*E21B 17/02* (2006.01)

(52) U.S. Cl.
CPC ......... *H01B 17/305* (2013.01); *E21B 17/023* (2013.01); *H02G 3/22* (2013.01); *H02G 9/06* (2013.01)

(58) Field of Classification Search
CPC ........................................ H02G 3/22
USPC ........................................ 174/650
See application file for complete search history.

(56) References Cited

U.S. PATENT DOCUMENTS

| | | | |
|---|---|---|---|
| 4,445,744 A * | 5/1984 | Sedig | H01R 13/521 439/271 |
| 5,017,740 A | 5/1991 | Honkomp et al. | |
| 6,957,981 B2 | 10/2005 | Karino et al. | |
| 7,168,984 B2 | 1/2007 | Perle et al. | |
| 7,364,451 B2 | 4/2008 | Ring et al. | |
| 7,901,247 B2 | 3/2011 | Ring | |
| 8,082,663 B1 | 12/2011 | Monroe et al. | |
| 9,553,398 B2 | 1/2017 | True et al. | |
| 2005/0060003 A1* | 3/2005 | Taylor | A61N 1/3754 607/36 |

* cited by examiner

*Primary Examiner* — Hoa C Nguyen
*Assistant Examiner* — Stanley Tso
(74) *Attorney, Agent, or Firm* — PatentFile, LLC; Bradley C. Fach; Steven R. Kick

(57) ABSTRACT

An integrated downhole electrical feedthrough package may include a metal shell having a metal web conduit disposed within the metal shell. A sealing channel may extend through the metal web conduit. One or more conducting pins may be disposed in the sealing channels. A dielectric seal may also be disposed in the metal web conduit, and the dielectric seal may electrically isolate the one or more conducting pins from the metal web conduit and metal shell. One or more isolators may also be disposed within the metal conduit and each isolator may surround a portion of each conducting pin disposed in the metal conduit. Each isolator may have a high coefficient of thermal expansion material, and a nonpolar surface which may be positioned proximate to a dielectric seal.

17 Claims, 15 Drawing Sheets

INTEGRATED DOWNHOLE ELECTRICAL FEEDTHROUGH PACKAGES

FIELD OF THE INVENTION

This patent specification relates to the field of electrical connectors useful in many applications, but particularly suitable for use in harsh environments. More specifically, this patent specification relates to electrical connectors for use in high-pressure, high-temperature (HPHT) applications which commonly occur in the downhole and subsea reservoirs.

BACKGROUND

Downhole logging tools are normally lowered into boreholes or cased wellbores to make formation evaluation measurements and infer properties of the formation surrounding the borehole and the fluids (gas, oil, water, or a mixed multi-phase) in the formation. These downhole tools may be an acoustic/ultrasonic logging tool, a neutron porosity tool, gamma-ray tool, density tool, a formation identification tool for measuring the earth formations surrounding a borehole, such as in a hydrocarbon (e.g., oil, natural gas, etc.) well. A wireline cable not only mechanically supports the downhole tool but also simultaneously provides electrical power to the tool and sends the measured data back to a surface data process unit. Such downhole logging instruments may be used to make such measurements while the well is being drilled, which is referred to as logging-while-drilling (LWD) or measurement-while-drilling (MWD). A downhole logging tool has electrical conductors mounted on the tool housing in a tubular structure. The logging tool includes a metal housing and with at least an electrical feedthrough or a plurality of electrical feedthroughs. An electrical feedthrough is coupled to the wireline cable from exterior downhole tool enclosure, and to the interior electronic circuits, and the internal sealing material is used to insulate the electrical transmissions from logging tool electronics to the wireline cable.

Electrical feedthroughs used in wireline tools, logging while drilling (LWD) and measurement while drilling (MWD) tools, as well as any other electronic instruments capable of being used in a downhole environment are subjected to a variety of harsh operating environments, which may exhibit pressures up to 30,000 PSI and temperatures up to 300 degrees Celsius. An electrical feedthrough consists of metal pin(s), sealed in an insulating material that may carry substantial amounts of power, either a few thousand volts or a few hundred ampere electric currents. The electronics inside the downhole tool requires a hermetic type electrical feedthrough that interconnects with surface instruments either for power and control signal transmission or for data transmission. The electrical feedthroughs must survive in such extreme hostile liquid environments such as brine, oil and water base drilling mud and fluids that may contain hydrogen sulfide, carbon dioxide, methane, and moisture.

Most of the used sealing materials are based on thermoplastic materials (such as Viton, Teflon, PEEK, and glass-reinforced-epoxy, etc.) for insulating the electrical transmissions from logging tool electronics to the wireline cable but the mechanical creeps under elevated temperature often limits its maximum continuous operating temperature to less than 200 degrees Celsius because of their low glass transition temperature (for example, Tg(PEEK)=143 degrees Celsius). Alternatively, a glass-to-metal dielectric sealing could provide high sealing strength, toughness and high resistivity and break-down voltage but its hermetic seal is frequently breakdown by high mechanical stress, introduced either by installation deformation or by mismatched coefficients of thermal expansion in the package materials. To improve glass-to-metal seal based high-pressure and high-temperature (HPHT) downhole electrical feedthrough reliability there is a need for providing a robust electrical feedthrough package and seal method.

For thermoplastic sealed electrical feedthroughs the thermoplastic material may be subject to creep and delamination between the metal pins and thermoplastic material, resulting in moisture passage into downhole logging tool electrical circuit sections. The glass-to-metal sealed electrical feedthrough and interconnector have the high mechanical strength and insulation strength that could protect inside logging or measurement electronics or instruments from extreme hostile liquid environments, but the seal may fail because of issues in potential high compressive stress in sealing material, installation induced mechanical deformation, low volumetric resistivity at elevated temperature, conductive ion fluid condensation, or/and high moisture absorption etc. Specifically, if the coefficient of thermal expansion (CTE) mismatch between the metal shell and the sealing material induced compressive stress has exceeded the maximum allowable strength of the sealing material, the micro or macro cracks could lead to the loss of the hermeticity and also to the water absorption for deteriorating the insulation strength. It is desirable that an electrical feedthrough package can be easily installed with downhole tool and bulkhead but also have highly reliable mechanical seal and electrical seal for operating from −40 degrees Celsius to 300 degrees Celsius with pressure up to 30,000 PSI.

Therefore a need exists for novel electrical feedthroughs for use in high-pressure, high-temperature, and other harsh environmental applications for providing downhole logging tools, LWD and MWD tools, power, signal, and data transmission. A further need exists for novel electrical feedthrough packages which may be able to prevent catastrophic downhole tool electric failures. There is also a need for novel electrical feedthrough packages which are able to operate for extended periods in water-based or moisture-rich oil-based wellbores. Furthermore, a need exists for novel electrical feedthrough packages which are able to operate while being repeatedly exposed to harsh environments such as found in open holes and closed bore holes.

BRIEF SUMMARY OF THE INVENTION

An integrated downhole electrical feedthrough package is provided which is suited for use in HPHT, and oil/gas reservoir and subsea harsh environmental applications. In some embodiments, the feedthrough may include a metal shell forming a conduit such as a metal web conduit. The metal conduit may include a single-sealing channel metal web conduit for making single-pin electrical feedthroughs or a multi-sealing channel metal web conduit for making multi-pin electrical feedthroughs. One or more conducting pins may be disposed in the either single-sealing channel or multi-sealing channel based metal web conduit. One or more dielectric seals may also be disposed in the either single-sealing channel or multi-sealing channel metal web conduit, and each dielectric seal may electrically isolate the one or more conducting pins from the metal web conduit. Each dielectric seal may have a central surface and a peripheral surface. In some embodiments, at least one isolator, and preferably a pair of isolators, may also be disposed within the metal conduit and each isolator may mechanically seal the metal web conduit. Each isolator may have a nonpolar surface for preventing the dipolar downhole fluid condensation, and a pair of isolators may be positioned symmetrically surrounding a dielectric seal.

In further embodiments, the feedthrough may include at least one isolator for single-directional feedthrough packages or a pair of isolators for bi-directional interconnector feedthrough packages, which may symmetrically surround a dielectric seal, and the isolators may function as an elastic cushion to damp external incidentally vibration or mechanical shock during downhole deployment events.

In still further embodiments, the package may include at least one isolator to be configured as a single-directional feedthrough package or a pair of isolators to be configured as a bi-directional interconnector feedthrough package, which may symmetrically surround a dielectric seal, and the isolators may function as fluid blockers to avoid downhole corrosive (PH<5 acidic or PH>10 alkali) fluids contacting the sealing material surface in case a package outer mechanical seal is failed.

In further embodiments, the feedthrough package may include at least one isolator to be configured as a single-directional feedthrough package or a pair of isolators to be configured as a bi-directional interconnector feedthrough package, which may symmetrically surround a dielectric seal, and the isolators may function as fluid blockers to avoid downhole conductive ion contained fluid condensed onto the sealing material surface in case a package outer mechanical seal is failed.

In further embodiment, the feedthrough package may include at least one isolator to be configured as a single-directional feedthrough package or a pair of isolators to be configured as a bi-directional interconnector feedthrough package, which may symmetrically surround a dielectric seal, and the isolators may function as a self-cleaner to enable the isolators to thermally remove condensed undesirable substances by thermal shear stress.

In also further embodiment, the feedthrough package may include at least one glass-to-metal seal for single-directional feedthrough package or a pair of glass-to-metal seals for bi-directional interconnector feedthrough package, and a glass-to-metal seal may function as a moisture blocker to avoid moisture passing into logging tool internal electrical circuit section.

In also further embodiment, the feedthrough package may include at least one glass-to-metal seal to be configured as a single-directional feedthrough package or a pair of glass-to-metal seals to be configured as a bi-directional interconnector feedthrough package, and a glass-to-metal seal may function as a high insulation resistor to prevent electrical breakdown at elevated downhole temperature.

In further embodiments, the downhole electrical feedthrough package may include two isolators which may symmetrically surround the dielectric seals, with a ceramic sleeve disposed between the two dielectric seals, and the ceramic sleeve may function as a mechanical barrier to prevent sealing material crack propagation from one side dielectric seal to opposite side dielectric seal.

In further embodiments, the downhole electrical feedthrough package may include a hybrid dielectric seal with nonpolar sealing material and glass-ceramic sealing material hybrid seal disposed in either single-sealing channel or multi-sealing channel, and the hybrid dielectric seal may function as a moisture barrier and high insulation resistor to prevent potential insulation resistance deterioration.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
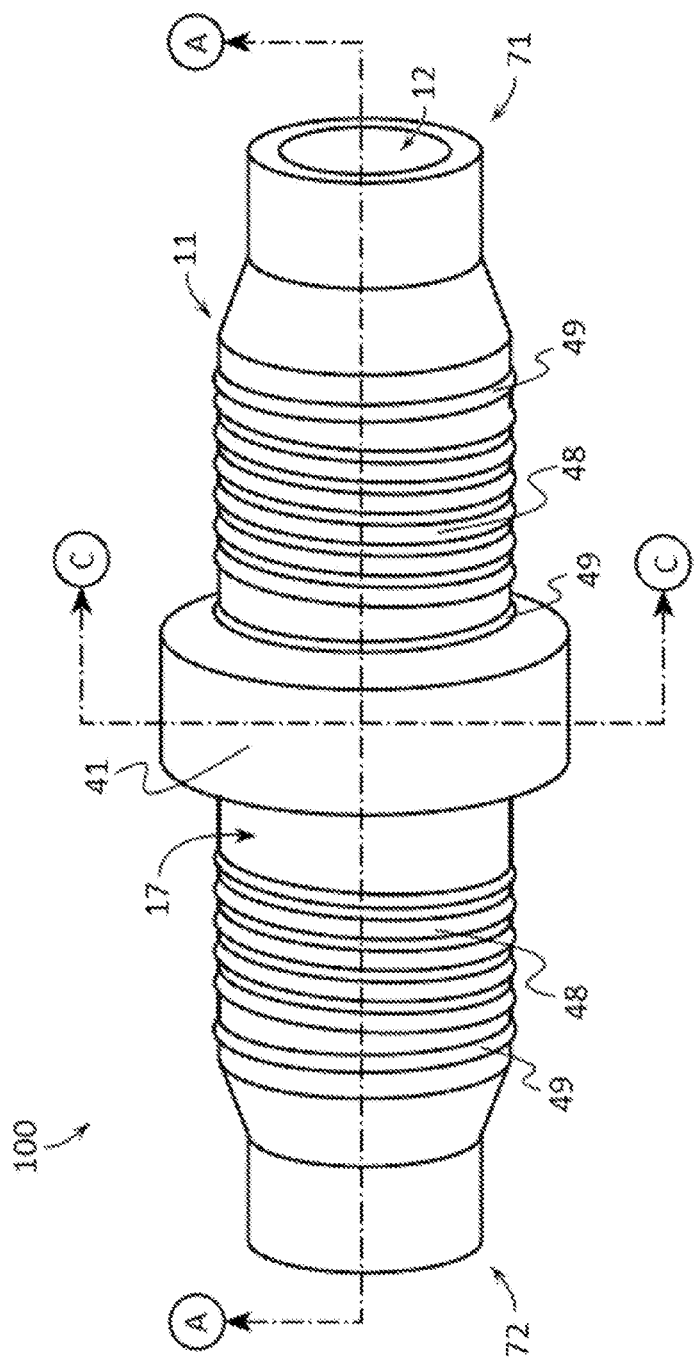
FIG. 1 depicts a perspective view of an example of a bi-directional downhole electrical feedthrough package according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

In some embodiments, a surface or element may be positioned proximate to another surface or element so that the two surfaces or elements are in contact with each other. In other embodiments, a surface or element may be positioned proximate to another surface so that the two surfaces or element are not in contact with each other but are between 0.001 to 10.0 millimeters from each other.

The electrical feedthroughs are widely used in many electrical instruments, but also used as electrical couplings or interconnections for providing electric power signal, and data transmission from downhole and subsea logging tools, operating in harsh environments, are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 1-10 illustrate examples of an isolator integrated downhole electrical feedthrough package ("the feedthrough package") 100 according to various embodiments. In some embodiments, the feedthrough package 100 may comprise a metal shell 11 forming a conduit which may be a metal conduit 12. In this example, the metal conduit 12 comprises a metal web conduit 45 and at least one isolator 31, 36 for single-directional feedthrough package or a pair of isolators for bi-directional electrical feedthrough package. A metal web conduit 45 may have a single-sealing channel 35 for depositing a single conducting pin 13, but in some examples the metal web conduit 45 may have multi-sealing channels 35 for depositing multiple conducting pins 13. In some embodiments, conducting pins 13 may be positioned through sealing channels 35 found in isolators 31 (FIGS. 11-12) and also into web conduits 12B of the metal web conduit 45 (FIG. 13). In this regard, sealing channels 35 in a broad sense are intended to surround conducting pin(s) 13 regardless of their position within the package 100.

One or more dielectric seals 21, 26, may be disposed in the web conduit 45, and each dielectric seal 21, 26, is intended to electrically isolate one or more conducting pins 13 from the metal shell 11, and metal web conduit 45. Each dielectric seal 21, 26, may have a central surface 22, 27, and a peripheral surface 23, 28. One or more isolators 31, 36, may be disposed within the metal conduit 12, and each conducting pin 13 is disposed in the sealing channel 35 and metal web conduit 45. Each isolator 31, 36, may have a nonpolar surface 32, 37 for eliminating polar downhole fluid condensation, and a pair of isolator distal surfaces 33, 38, may be positioned symmetrically surrounding a dielectric seal 21, 26.

The metal shell 11 may comprise a metal conduit 12 which may receive one or more dielectric seals 21, 26, isolators 31, 36, sealing channels 35, electrical conducting pins 13, and/or metal web conduit 45. The isolator 31, 36 may be made from thermoplastic materials (PAI, PEEK or a combination of PAI and PEEK) with single-pin (FIG. 12) and multi-pin (FIG. 11) hollow configurations. The isolators 31, 36 are sealed inside the metal shell 11 and symmetrically surround the metal web conduit 45 or dielectric seal 21, 26. Generally, the metal shell 11 may comprise a hollow cylindrical shape having an outer surface 17 and an inner surface 18 for receptacle or plug mating. The metal shell 11 may comprise a first end 71 and an opposing second end 72. One or more sealing channels 35 and conducting pins 13 may be disposed within the metal web conduit 45 extending between the first end 71 and second end 72. In some embodiments, the metal shell 11 may comprise or be formed from a metal having a first coefficient of thermal expansion (am). Metals which may be used to form the metal shell 11 may include Titanium alloys, Stainless Steel alloys, Nitronic alloys, Inconel alloys, and any other metal alloys preferably with a minimum chromium content substantially of 10.5% for providing anti-corrosion strength.

The feedthrough package 100 may comprise at least one metal web conduit 45 as perhaps best shown in FIGS. 7-10. In some embodiments, a metal web conduit 45 may be used to position an element of the feedthrough package 100, such as one or more dielectric seals 21, 26, ceramic sleeves 51, and/or isolators 31, 36, within the metal conduit 12. As perhaps best shown in the example of FIG. 10, a metal web conduit 45 may function to position single or multiple conducting pin(s) 13, where the pin number could range from 1, 3, 5, 7, 9, 11, 15, 18, 31, 37, 41, 55, 61, 66, 79, 100, 128 etc.), that is sealed in a dielectric seal 21, 26 within the metal web conduit 45. In further embodiments, a metal web conduit 45 may be used to hermetically couple an element of the feedthrough package 100, such as a dielectric seal 21, 26, ceramic sleeve 51, and/or isolator 31, 36, to the metal shell 11. A metal web conduit 45 may be made from the same metal material as metal shell with its coefficient of thermal expansion equal to am. In embodiments of the feedthrough package 100 comprising a metal web conduit 45, a dielectric seal 21, 26, positioned around a conducting pin 13, for electrically isolating the conducting pin 13 from the metal web conduit 45 and the metal shell 11.

In some embodiments, the feedthrough package 100 may comprise a flange 41 which may be coupled to the outer surface 17 of the metal shell 11 for assisting installation with either a bulkhead or a downhole logging tool enclosure. Preferably, a flange 41 may be generally annular in shape and may encircle a section of the metal shell 11. Optionally, a flange 41 may comprise one or more fastener apertures 42 (FIG. 10) which may receive fasteners such as bolts, rivets, and the like, which may be used to secure a feedthrough package 100 to either a bulkhead or a downhole logging tool enclosure surface. In further preferred embodiments, a flange 41 may encircle a section of the metal shell 11 that contains one or more dielectric seals 21, 26, ceramic sleeves 51, isolator junction 24, 29. In some embodiments, a flange 41 may comprise or be formed from the same metal material as metal shell, and from any other metal alloys preferably with a minimum chromium content substantially of 10.5% with a similar CTE as the metal shell 11.

Figure 3:
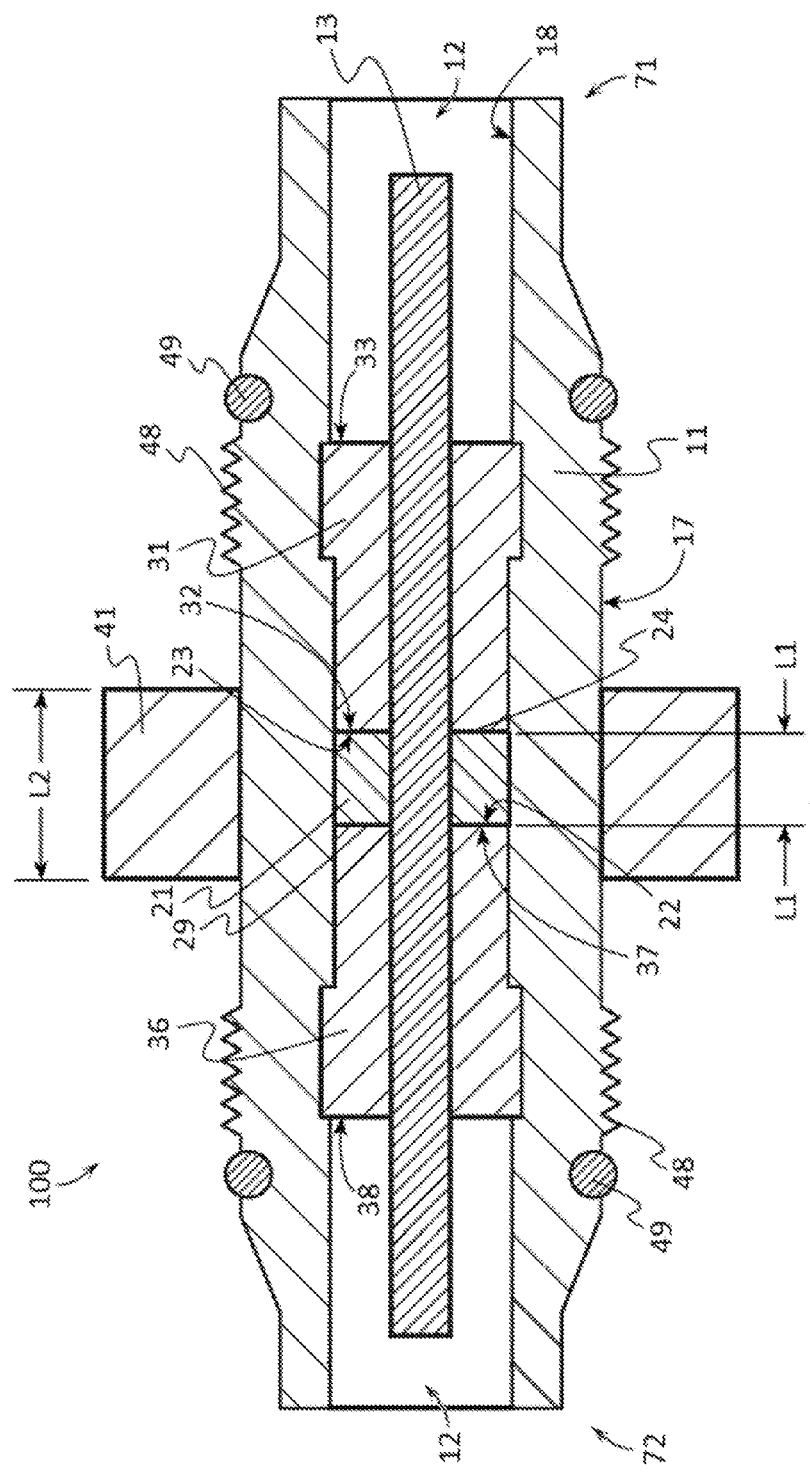
FIG. 3 shows a sectional, through line A-A shown in FIG. 1, elevation view of a single conducting pin example of a bi-directional downhole electrical feedthrough package according to various embodiments described herein.
Figure 4:
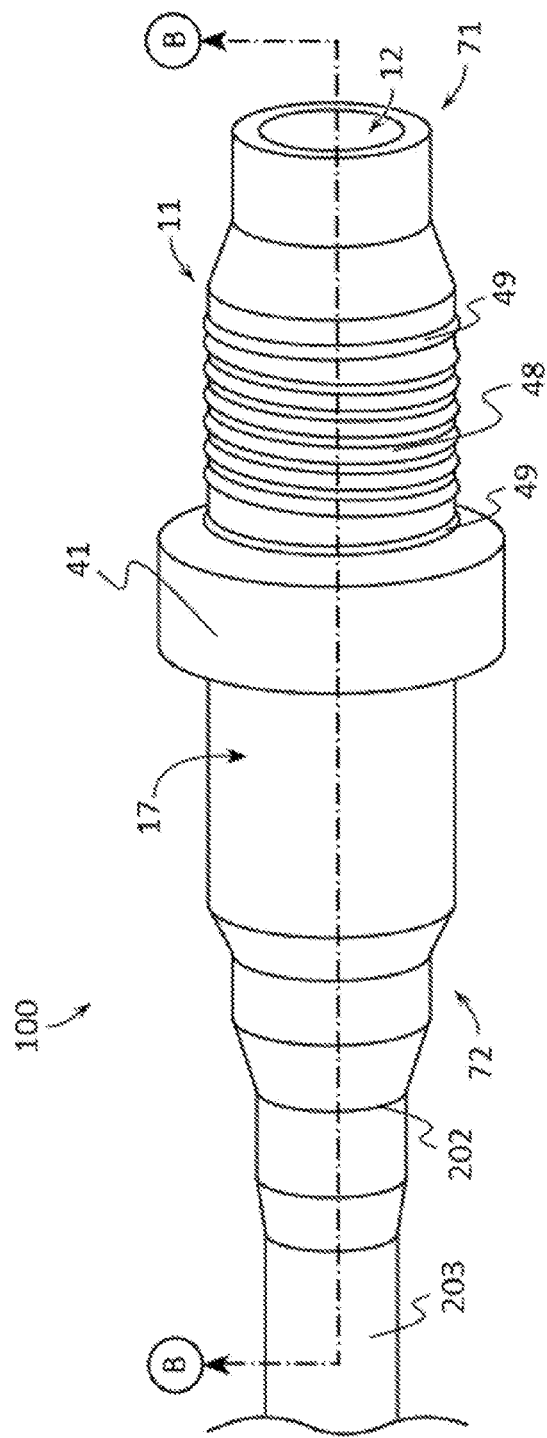
FIG. 4 depicts a perspective view of an example of a single-directional downhole electrical feedthrough package according to various embodiments described herein.
Figure 8:
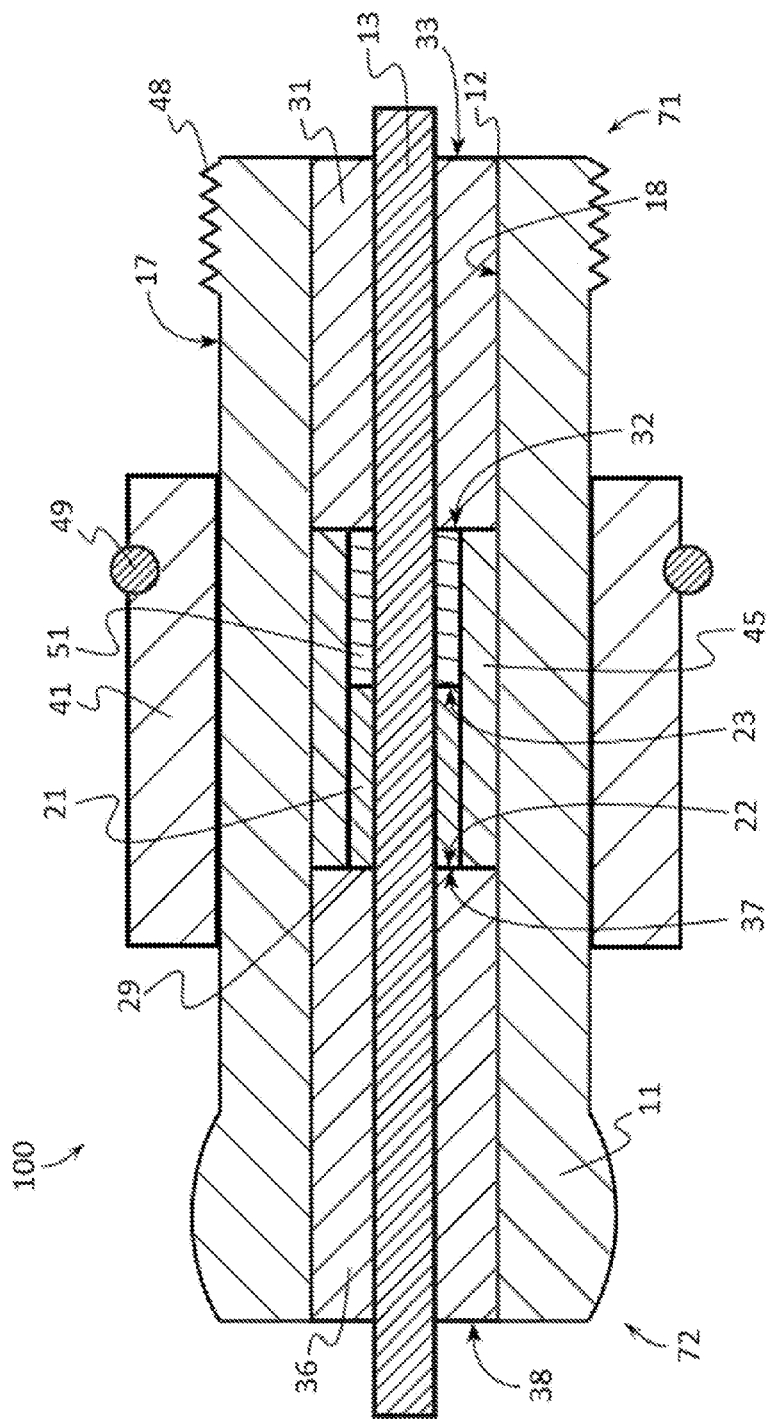
FIG. 8 illustrates a sectional elevation view of a further example of a single conducting pin bi-directional downhole electrical feedthrough package according to various embodiments described herein.
Figure 9:
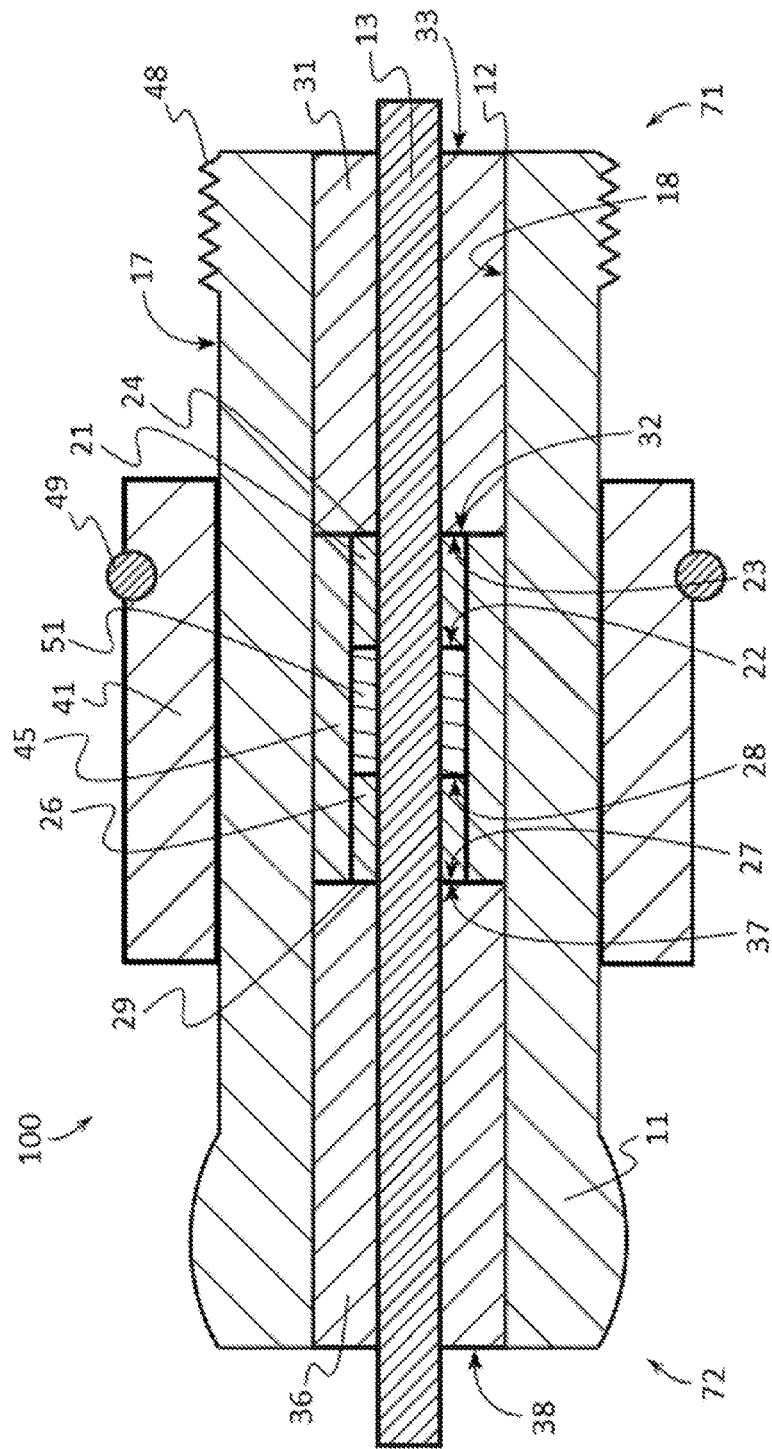
FIG. 9 shows a sectional elevation view of still another example of a single conducting pin bi-directional downhole electrical feedthrough package according to various embodiments described herein.

As perhaps best shown in FIG. 3, a dielectric seal 21 may have length L1 and a flange 41 may have a length L2. The length L1 of a dielectric seal 21 may describe the sealing length of a dielectric seal 21, 26 in the metal web conduit 45. Similarly, the length L2 of a flange 41 may describe the plate thickness that an installation flange 41 may extend along the length of the metal shell 11 between the first end 71 and the second end 72. In preferred embodiments, L2 may be greater than or equal to L1 so that the flange 41 has a greater thickness than the sealing length of the dielectric seal 21, 26. In further embodiments, L2 may be 100% to 250% of L1. In still further embodiments and as best shown in FIGS. 8 and 9, the length L2 of a flange 41 may encircle a section of the metal shell 11 that contains one or more dielectric seals 21, 26, ceramic sleeves 51 and the flange 41 may be greater than or equal to the combined sealing length of the one or more dielectric seals 21, 26, and ceramic sleeves 51.

In some embodiments, the metal shell 11 may comprise one or more sets of threading 48 which may be used to attach the feedthrough package 100 to objects such as bulkheads of downhole logging instruments and the like and which may prevent downhole fluid invasion into the feedthrough package 100. Optionally, the feedthrough package 100 may comprise one or more exterior mechanical seals 49 which may be positioned on the outer surface 17 of the metal shell 11 and which may prevent downhole fluid invasion into the feedthrough package 100. An exterior mechanical seal 49 may be brought into contact with an object that the feedthrough package 100 is coupled to and the exterior mechanical seal 49 may function to seal the junction between the connector package 100 and the object. For example, when the feedthrough package 100 is threadedly coupled an object via threading, an exterior mechanical seal 49 may be brought into contact with the object to seal out and prevent contaminants from entering the junction between the feedthrough package 100 and the object.

In some embodiments, an exterior mechanical seal 49 may comprise an O-ring which may be positioned anywhere on the outer surface 17 of the metal shell 11 and may be or comprise a high-temperature thermoplastic material that can be down selected from polyacrylate (ACM), ethylene acrylate (AEM), butyl rubber (IIR), polychloroprene rubber (CR), ethylene propylene rubber (EPM, EPR, EPDM), fluorosilicone (FVMQ), acrylontirile-butadiene (NBR), hydrogenated nitrile (HNBR, HSN), polyurethane (AU, EU), silicone rubber (VMQ, PVMQ), fluorocarbon (FKM, FPM), tetrafluoroethylene-propylene (AFLAS™), high performance fluoroelastomer (Hifluor™), perfluoroelastomer, and perfluoroelastomer (ULTRA). In other embodiments, an exterior mechanical seal 49 may be a metal C-ring (such as from Parker Hannifin Corporation), which may be made from or comprise Inconel Alloy, Stainless Steel Alloy, or any other high strength metal or metal alloy. In alternative embodiments, an exterior mechanical seal 49 may comprise more than one seals with different sealing material, or mechanically sealing method.

The feedthrough package 100 may comprise single or multiple conducting pins 13, having a second coefficient of thermal expansion ($\alpha_p$), and sealed in the sealing channel(s) 35, which may be used to conduct electricity through the feedthrough package 100. A conducting pin 13 may comprise an electrically conductive material which may be used to communicate electricity through the feedthrough package 100. Preferably, the ends of the conducting pins 13 may extend from the metal conduit 12 of the metal shell 11 for interconnecting with circuit leads or by mating with a receptacle or plug. In some embodiments, a conducting pin 13 may be made from titanium alloys, copper, copper alloys, Beryllium copper (BeCu) alloys, chromium copper (CrCu) alloys, brass, Inconel alloys, Alloy 52, other nickel-iron alloys, Kovar alloy, and other nickel-cobalt ferrous alloys. In other embodiments, a conducting pin 13 may be plated with an electrically conductive material, such as 2-5 micrometer thick Nickel and Gold bilayers for providing better electrically contact against potential ion outer diffusion from the pin material into the sealing material.

The feedthrough package 100 may comprise one or more dielectric seals 21, 26, which may be used to electrically insolate one or more conducting pins 13 from another element of the feedthrough package 100. In some embodiments, a dielectric seal 21, 26, may be disposed in the metal web conduit 45 to insulate a conducting pin 13 from the metal web conduit 45 that may be in contact with the metal shell 11. In preferred embodiments, a dielectric seal 21, 26, may be in hermetical contact or hermetically coupled with the inner surface 18 of the metal shell 11. In further embodiments, a dielectric seal 21, 26, may be in hermetical contact or hermetically coupled with a metal web conduit 45 and the metal web conduit 45 may be in hermetical contact or hermetically coupled (optionally by being integrally formed together) with the inner surface 18 of the metal shell 11. Generally, the portion or surface of a dielectric seal 21, 26, that is facing the first end 71 of the metal shell 11 and that is not in contact with the metal shell 11 and/or a metal web conduit 45 may be referred to as a peripheral surface 23, 28, while the portion or surface of a dielectric seal 21, 26, that is facing the second end 72 of the metal shell 11 and that is not in contact with the metal shell 11 and/or a metal web conduit 45 may be referred to as a central surface 22, 27.

A dielectric seal 21, 26, may comprise an electrically non-conductive material having a coefficient of thermal expansion ($\alpha_g$) which may be used to secure the communication of electricity through the entire feedthrough package 100. Optionally, a dielectric seal 21, 26, may comprise a sealing material of a water insoluble glass oxides such a quaternary $B_2O_3$-$Bi_2O_3$-MO-REO glass system or material with MO=ZnO, BaO, $TiO_2$, $Fe_2O_3$ and REO represents lanthanum series based rare earth oxides (REO). The glass system has its glass transition temperature ranging from 350 degrees Celsius to 500 degrees Celsius, which has less than 0.0004% water absorption at during 24 hr ambient water immersion that prevents leaked moisture passing from pin into logging tool electrical circuit section. For example, a ternary $Bi_2O_3$—$B_2O_3$—ZnO dielectric sealing material may have −400 MPa compression strength, $8.5 \times 10^{-6}$ m/m·K thermal expansion, and 400 degrees Celsius glass transition temperature, and offers high moisture resistance against water and moisture induced electrical insulation degradation. In further preferred embodiments, a dielectric seal 21, 26, may be made from or comprise a glass-ceramic material with a minimum ambient insulation resistance of $1.0 \times 10^{12} \Omega$, compression strength of −500 MPa, and coefficient of thermal expansion of $(8.0 \pm 1.0) \times 10^{-6}$ m/m·K. In alternative embodiments, a dielectric seal 21, 26, may be made from or comprise any glass material or glass-ceramic material with high volume resistivity of $1.0 \times 10^{13}$ to $1.0 \times 10^{15}$ $\Omega$-cm to provide good electrical insulation at least at maximum downhole temperature.

In accordance with various embodiments, a mathematical analysis is performed using the package material mechanical, physical and thermal parameters to arrive at compressive thermo-mechanical stress in the dielectric sealing material. In particular, a system of equations is created, where the equations relate a thermal response (namely, temperature dependent mechanical stress) due to different material (metal, glass-ceramic, and thermoplastic) integration, especially the mismatched coefficient of thermal expansions ($\alpha_m > \alpha_g$ and $\alpha_p > \alpha_g$). The compressive shear stress equations is solved by $$\sigma_g(T, P) = \left(\frac{1}{4\frac{L}{\phi_g}}\right)\left(\frac{\phi_g^2 - \phi_p^2}{2\phi_g^2}\right)[\sigma_\tau - \sigma_r] + \mu_{mg}\left(\frac{1}{4\frac{L}{\phi_g}}\right)P, \quad (1)$$

where P is hydraulic pressure and the radial stress in the feedthrough package is $$\sigma_r = \frac{\Delta\sigma_{g-p} \cdot \phi_p^2 - \Delta\sigma_{m-g} \cdot \phi_g^2 + \phi_g^2\phi_p^2(\Delta\sigma_{g-p} - \Delta\sigma_{m-g})/\phi^2}{(\phi_g^2 - \phi_p^2)}, \quad (2\text{-}1)$$

$$\phi_p < \phi < \phi_g,$$

and circumferential stress in the feedthrough package is $$\sigma_\tau = \frac{\Delta\sigma_{g-p} \cdot \phi_p^2 - \Delta\sigma_{m-g} \cdot \phi_g^2 - \phi_g^2\phi_p^2(\Delta\sigma_{g-p} - \Delta\sigma_{m-g})/\phi^2}{(\phi_g^2 - \phi_p^2)}, \quad (2\text{-}2)$$

$$\phi_p < \phi < \phi_g,$$

and the coefficient of thermal expansion mismatch induced mechanical stress can be described as $$\Delta\sigma_{g-p} = \frac{\phi_g^2\phi_p^2}{(\phi_g^2 - \phi_p^2)\phi^2}\xi_{gp}\left(\frac{Y_g \cdot \alpha_g}{1 - v_g^2} - \frac{Y_p \cdot \alpha_p}{1 - v_p^2}\right)(T_g - T), \phi_p < \phi < \phi_g, \quad (3\text{-}1)$$

$$\Delta\sigma_{m-g} = \frac{\phi_g^2\phi_m^2}{(\phi_m^2 - \phi_g^2)\phi^2}\xi_{mg}\left(\frac{Y_m \cdot \alpha_m}{1 - v_m^2} - \frac{Y_g \cdot \alpha_g}{1 - v_g^2}\right)(T_g - T), \phi_g < \phi < \phi_m, \quad (3\text{-}2)$$

where $0 \leq \xi_{gp} \leq 1$ and $0 \leq \xi_{mg} \leq 1$ represent coefficients of mechanical coupling between the sealing material and the pin and the metal shell, respectively.

Figure 15:
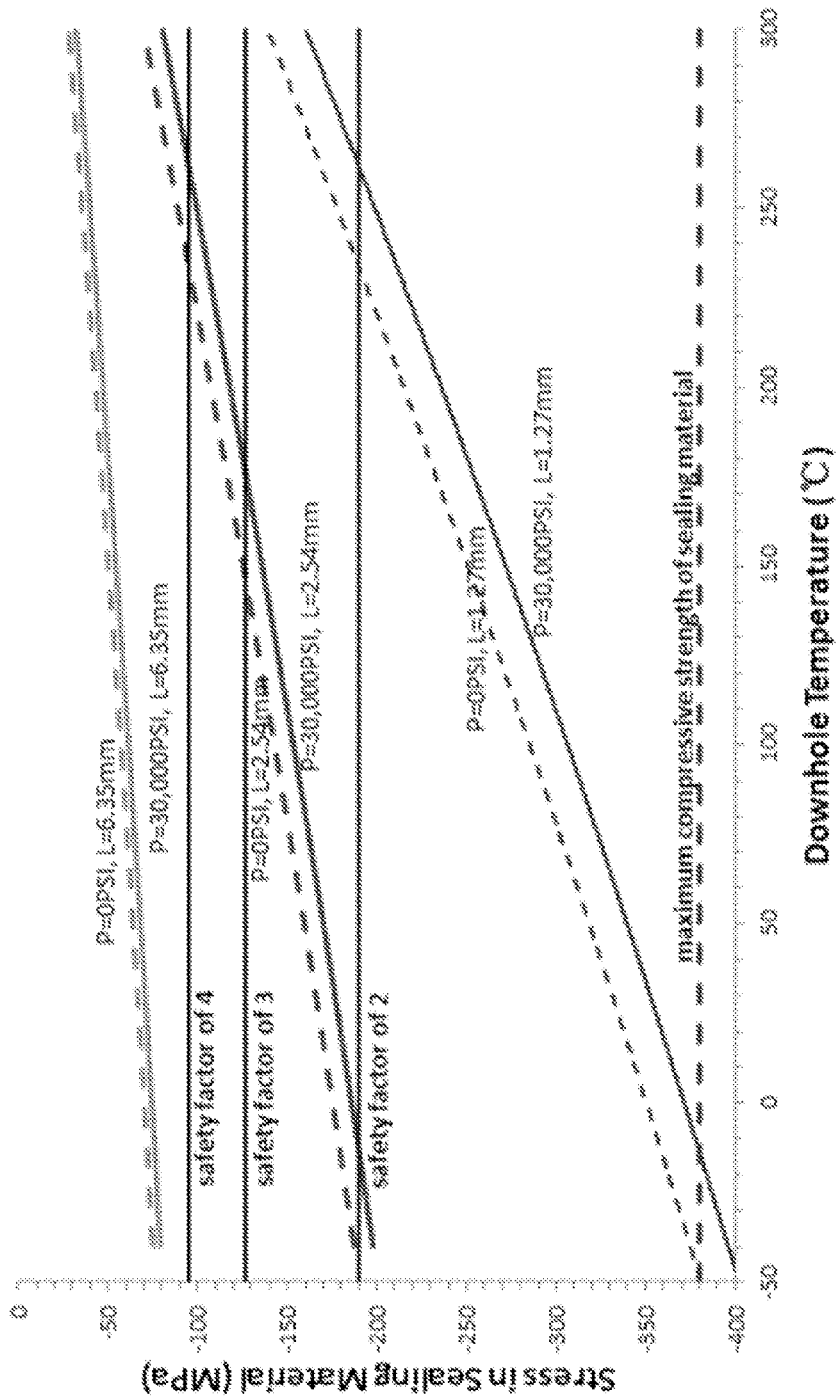
FIG. 15 illustrates a graph illustrating sealing length dependent thermo-mechanical stress amplitude of an example CTE mismatch based electrical feedthrough from −40° C. to +300° C. and at zero and 30,000 PSI hydraulic pressures, respectively.

In preferred embodiments, the tensile thermo-mechanical stresses in the metal shell 11 and metal web conduit 45 have to be of 2-4 times lower than maximum allowable stress of the metal shell 11 or metal web conduit 45 material. For example, the maximum allowable tensile stress for Inconel alloy X750 and 718 is about 198 MPa and 256 MPa, respectively. Another example is 304L stainless steel with its maximum allowable tensile stress is about 115 MPa. On the other hand, in preferred embodiments, the compressive thermo-mechanical stresses in the dielectric seal 21, 26, body have to be of 2-4 times lower than maximum compression stress of the dielectric sealing material used to form the dielectric seals 21, 26. Due to highly CTE mismatch between metal shell 11 or metal web conduit 45 and dielectric sealing material 21, 26, in a preferred embodiment, the ratio of the dielectric seal 21, 26, outer diameter over conducting pin 13 diameter is limited to 2.5-3.0, and sealing length L1 is 2.5-3.0 times of the dielectric seal 21, 26, outer diameter. As an example for making a thermo-mechanical stress optimized electrical feedthrough package 100, the prototyped electrical feedthrough has sealing length dependent thermo-mechanical stress amplitude from −40° C. to +300° C. FIG. 15 is an example for making a mismatched feedthrough package disclosed in this disclosure. At each specific sealing length the dashed curve corresponds to net thermo-mechanical stress where the hydraulic pressure P=0 psi. On the contrary, the solid curve corresponds to both thermal and hydraulic pressure contributed thermo-mechanical stress, where P=30,000 psi (30 ksi) hydraulic pressure. Note that there is a horizontal dashed line, labeled by "Glass maximum compression strength", which indicates the maximum compression strength of sealing material of −380 MPa. Additionally, there are three solid lines that correspond to the thermo-mechanical stress amplitude is ½, ⅓, and ¼ of the maximum compression strength of the sealing material, which are labeled by "safety factor of 2", "safety factor of 3", and "safety factor of 4", respectively. The thermo-mechanical stress could be effectively reduced with a long seal; on the contrary, a short-sealing length could lead to high compressive stress amplitude. In this case, the sealing material may be readily cracked especially at extremely cold weather condition, such as in Alaska oilfields.

Thus, the mechanical seal, provided from a sealing material of 2.54 mm<L<6.35 mm, will be preferred at least the internal stress is 2-4 times lower than maximum compression strength of sealing material. It should be pointed out that the hydraulic pressure from downhole could effectively increase extra shear mechanical stress. However, this "extra stress" is about 20 MPa at $\phi_g/\phi_p=2.56$ and $L/\phi_g=2.34$, which further increases total compressive thermo-mechanical stress onto the sealing material hollow cylinder body. The sealing length of 2.54 mm<L<6.35 mm seems to be acceptable sealing length range that corresponds to a thermo-mechanical stress amplitude variation of about 100 MPa from −40° C. to +300° C.

In some embodiments, the feedthrough package 100 may comprise one or more isolators 31, 36, which may also be used to electrically insolate one or more conducting pins 13 from another element of the feedthrough package 100. In some embodiments, an isolator 31, 36, may be disposed in the metal conduit 12 to insulate a conducting pin 13 from the metal shell 11 and/or a metal web conduit 45 that may be in contact with the metal shell 11. In preferred embodiments, an isolator 31, 36, may be in hermetical contact or hermetically coupled with the inner surface 18 of the metal shell 11. In further embodiments, an isolator 31, 36, may be in hermetical contact or hermetically coupled with a metal web conduit 45 and the metal web conduit 45 may be in hermetical contact or hermetically coupled with the inner surface 18 of the metal shell 11. Generally, the portion or surface of an isolator 31, 36, that is facing an end 71, 72, of the metal shell 11 and that is not in contact with the metal shell 11 may be referred to as a distal surface 33, 38, while the portion or surface of a dielectric seal 21, 26, that is facing a dielectric seal 21, 26, and that is not in contact with the metal shell 11 may be referred to as the nonpolar surface 32, 37.

In further embodiments, a portion of a isolator 31, 36, such as a nonpolar surface 32, 37, may be in contact with a portion of a dielectric seal 21, 26, such as a central surface 22, 27, or peripheral surface 23, 28, thereby allowing the isolator 31, 36, to provide elastic cushion to the dielectric seal 21, 26, to damp the transmission of external incidentally vibration to the dielectric seal 21, 26, during downhole deployment events of the feedthrough package 100. In still further embodiments, a portion of a isolator 31, 36, such as a nonpolar surface 32, 37, may be in contact with a portion of a dielectric seal 21, 26, such as a central surface 22, 27, or peripheral surface 23, 28, thereby allowing the isolator 31, 36, to provide a mechanical barrier to prevent a downhole fluid from contacting the dielectric seal 21, 26, during downhole deployment events of the feedthrough package 100. In even further embodiments, the feedthrough package 100 may comprise one or more isolator junctions 24, 29, which may reduce vibration forces or mechanical shock upon a dielectric seal 21, 26. An isolator junction 24, 29, may be formed where a peripheral surface 23, 28, or central surface 22, 27, of a dielectric seal 21, 26, meets a nonpolar surface 32, 37, of an isolator 31, 36.

In further embodiments, the feedthrough package 100 may include at least one isolator 31, 36, for being configured as a single-directional feedthrough package 100 or a pair of isolators 31, 36, for being configured as a bi-directional interconnector feedthrough package 100, which may symmetrically surround a dielectric seal 21, 26, and the isolators 31, 36, may function as a fluid blocker to avoid downhole corrosive (PH<5 acidic or PH>10 alkali) fluids contacting a surface 22, 23, 27, 28, of a dielectric seal 21, 26, (sealing material) in case a feedthrough package 100 outer conduit mechanical seal 49 fails.

In further embodiments, the feedthrough package 100 may include at least one isolator 31, 36, for being configured as a single-directional feedthrough package 100 or a pair of isolators for being configured as a bi-directional interconnector feedthrough package 100, which may symmetrically surround a dielectric seal 21, 26, and the isolators 31, 36, may function as a fluid blocker to avoid downhole conductive ion containing fluid from being condensed onto a surface 22, 23, 27, 28, of a dielectric seal 21, 26, (sealing material) in case a feedthrough package 100 outer mechanical seal 49 fails.

In further embodiment, the feedthrough package may include at least one isolator 31, 36, for being configured as a single-directional feedthrough package 100 or a pair of isolators 31, 36, for being configured as a bi-directional interconnector feedthrough package 100, which may symmetrically surround a dielectric seal 21, 26, and the isolators 31, 36, may function as a self-cleaner to enable the isolators 31, 36, to thermally remove condensed undesirable substances by thermal shear stress. An isolator 31, 36, may comprise an electrically insulating material having a fourth coefficient of thermal expansion ($\alpha_{isolator}$) which may be used to prevent the communication of electricity or electric signal through the entire length of the conduit or through the metal shell 11 of the feedthrough package 100. In some embodiments, an isolator 31, 36, may be made from or comprise a nonpolar thermoplastic such as thermoplastic aromatic polyether ketones, polyamide-imide (PAI), polyether ether ketone (PEEK), PolyEtherKetone (PEK), polyaryletherketone (PAEK), and Polyetherketoneketone (PEKK), based organic thermoplastics or a mixing composition from above materials. In preferred embodiments, an isolator 31, 36, may be made from or comprise high-temperature PAI or glass-reinforced PAI thermoplastic material. In alternative embodiments, isolator 31, 36, may be made from or comprise any engineered thermoplastic with high-continuous-operation-temperature of ≥260 degrees Celsius, and high compression strength of ≥18,000 PSI. Table 1 has listed most of desirable mechanical, physical, electrical and mechanical parameters for two materials which may be used to form an isolator 31, 36.

TABLE 1

Material Properties of typical thermoplastic PEEK and PAI materials

| Material Parameters | PEEK | PAI |
|---|---|---|
| Water Absorption at 23° C. for 24 h (ISO 62) | 0.5% | 0.3% |
| Glass Transition Temperature (° C.) | 143 | 280 |
| Coefficient of Thermal Expansion (μm/m.K) | 55-140 | 35-40 |
| Volume Resistivity (Ω-cm) | $10^9$-$10^{16}$ | >$10^{14}$ |
| Dielectric Strength (KV/mm) | 23 | 28 |
| Thermal Conductivity (W/m.K) | 0.29 | 0.36 |
| Tensile Strength (MPa) | 98 | 125 |
| Tensile Modulus of Elasticity (GPa) | 4.0 | 6.4 |
| Compression Strength (psi) | 18,125 | 18,000-24,000 |
| Max continuous operating temperature (° C.) | 249 | 260 |

It is clear that Polyamide-imide (PAI) based thermoplastic material has a similar or a little better performance than PEEK based material as an isolator. For example, PAI material has better tensile, compression strengths, high maximum continuous operating temperature, glass transition temperature, water absorption, and dielectric strength than PEEK material. PAI is a reaction product of trimellitic anhydride and aromatic diamines, commercially available from WS Hampshire, Curbell Plastics, and Solvay, which has superior resistance to elevated temperature and severe stress at continuous temperature of 260 degrees Celsius and high compressive strength and impact resistance. However, PEEK has a relative higher CTE than PAI material. It is due to PEEK high CTE property, the isolator (FIG. 11 and FIG. 12) is composed of PAI based material 61 and the PEEK based material 62. For single-pin or multi-pin based feedthrough package 100, the isolator may have number of hollow sealing channel 35 for conducting pin 13 penetration. In one embodiment, the PEEK material is coated onto PAI cylinder and positioned on surface 37 to potential downhole fluid invasion. In another embodiment, the isolator is made from alternative stack of PEEK and PAI cylinder blocks (FIG. 11C and FIG. 12C).

In some embodiments, the feedthrough package 100 may comprise a metal shell 11 and metal web conduit 45 made from a metal having a first coefficient of thermal expansion ($\alpha_m$). The feedthrough package 100 may also comprise one or more dielectric seals 21, 26, made from a dielectric glass-ceramic sealing material comprising a second coefficient of thermal expansion ($\alpha_g$), one and more conducting pins 13 made from a metal material having third coefficient of thermal expansion ($\alpha_p$); and one or more isolators 31, 36, made from a nonpolar thermoplastic having a fourth coefficient of thermal expansion ($\alpha_{isolator}$). Despite of highly mismatch between one or more of the coefficients of thermal expansion the feedthrough package 100 could still reliably perform within a wide temperature and pressure ranges. In some embodiments, the first coefficient of thermal expansion from metal shell 11 and metal web conduit 45 may be 50-100% greater than the second coefficient of thermal expansion of the glass-ceramic sealing material. In further embodiments, the third coefficient of thermal expansion from conducting pin 13 may be one to two times greater than the second coefficient of thermal expansion of the glass-ceramic sealing material. In further embodiments, the fourth coefficient of thermal expansion from the isolators 31, 36, may be more than two times greater than the first coefficient of thermal expansion of the metal shell 11 material. These mismatches could be compensated by appropriate ratio of $\phi_g/\phi_p$ and $L/\phi_g$ as well as the fabrication processes.

The feedthrough package 100 may comprise one or more isolators 31, 36 which may be firstly used as vibration damper or elastic cushion against unexpected mechanical shock especially during installation process or operation in the lateral or horizontal wells. The preferred function is to provide vibration damper to reduce feedthrough package 100 mechanically deformation that frequently causes dielectric seal(s) 21, 26 cracks or loss of the hermeticity for moisture passage into the electrical circuit section of a downhole logging enclosure. However, one or more isolators 31, 36 may also be secondly used as a mechanical seal in the feedthrough package 100 to block downhole fluid potentially leaked from first mechanical fitting seal failure for condensing onto the sealing material surface. An isolator may be made from PAI or glass-reinforced PAI thermoplastic material 61 (FIG. 11A and FIG. 12A) because of high compression strength of 18,000-24,000 PSI. The isolators 31, 36, may be injected or pressed shrink fits after glass-to-metal seal fabrication process of a dielectric seal 21, 26, is completed with typical size of φ15 mm×L20 mm by injection molding process, including plasticizing, injection, cooling, and ejection from the electrical feedthrough package 100. Since this injection molding may follow the glass-to-metal seal process, the thermoplastic cylinder has an amount compression provided by the CTE mismatch between metal shell 11 or metal web conduit 45 and thermoplastic material after the cooling process. The quality of this isolator 31, 36, can be estimated by the compression formula:

$$\sigma = (Y_m \cdot \alpha_m - Y_{isolator} \cdot \alpha_{isolator}) \cdot (T_0 - T)$$

where To corresponds to ambient temperature and T is downhole temperature, Y and α are Young's modulus and coefficient of thermal expansion of metal shell 11 and isolator 31, 36, respectively. Since isolators 31, 36, can be made by a hybrid of different thermoplastics, such as PAI and PEEK, this compressive stress could be controlled by effective Young's modulus and thermal expansion of the isolators 31, 36.

Figure 11A:
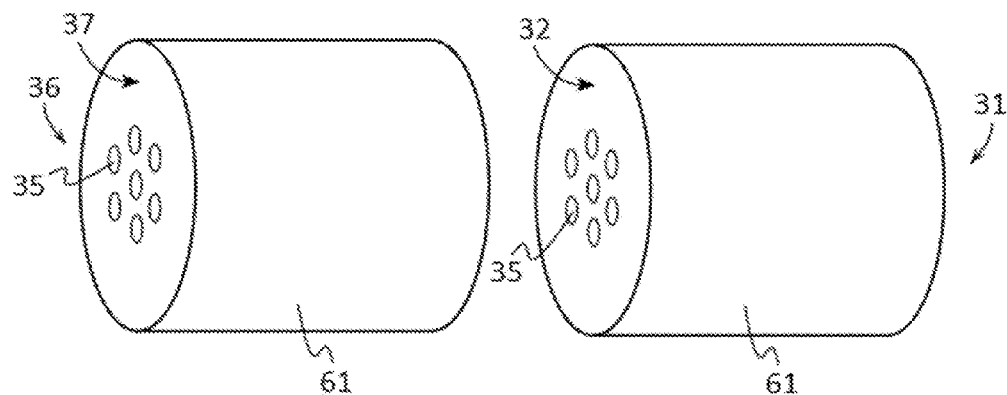
FIG. 11A shows an exemplary high-strength thermoplastic PAI materials based pair of isolators which may be positioned within the metal web conduit and through which multiple conducting pins may be inserted through multi-sealing channels in the metal web conduit or formed into the conduit according to various embodiments described herein.
Figure 11B:
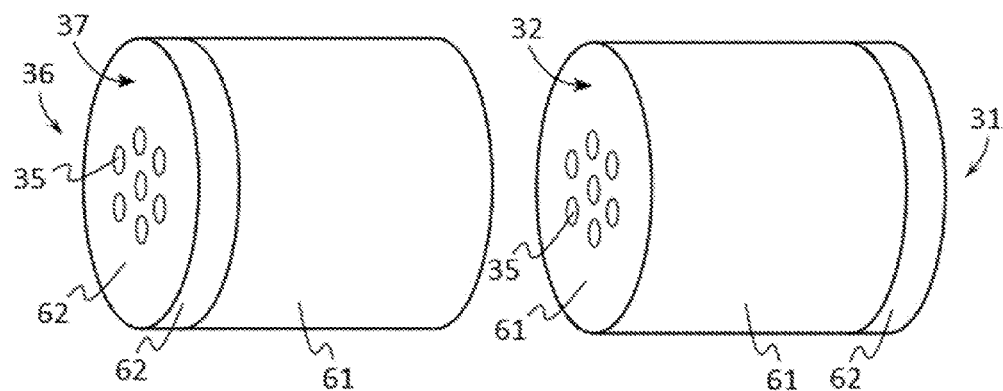
FIG. 11B shows another exemplary a nonpolar PEEK thermoplastic coated PAI material-based pair of isolators which may be positioned within the metal web conduit and through which multiple conducting pins may be inserted through multi-sealing channels in the metal web conduit or formed into the conduit according to various embodiments described herein.
Figure 11C:
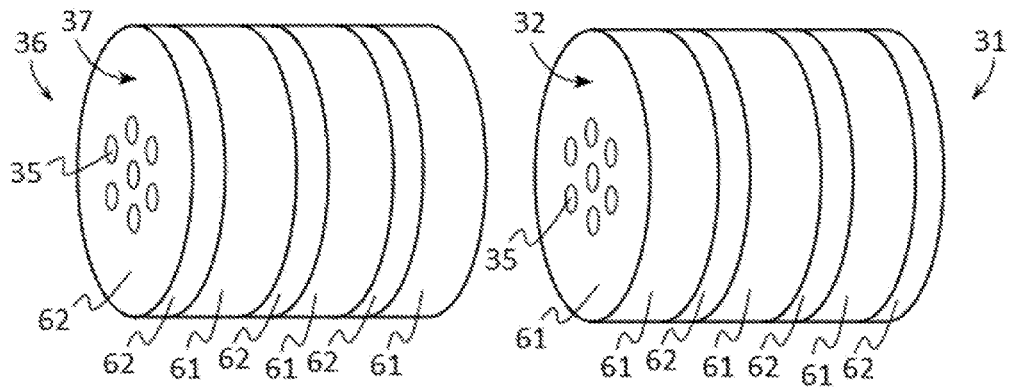
FIG. 11C shows still another exemplary a PEEK and PAI alternative composition based pair of isolators which may be positioned within the metal web conduit and through which multiple conducting pins may be inserted through multi-sealing channels in the metal web conduit or formed into the conduit according to various embodiments described herein.
Figure 12A:
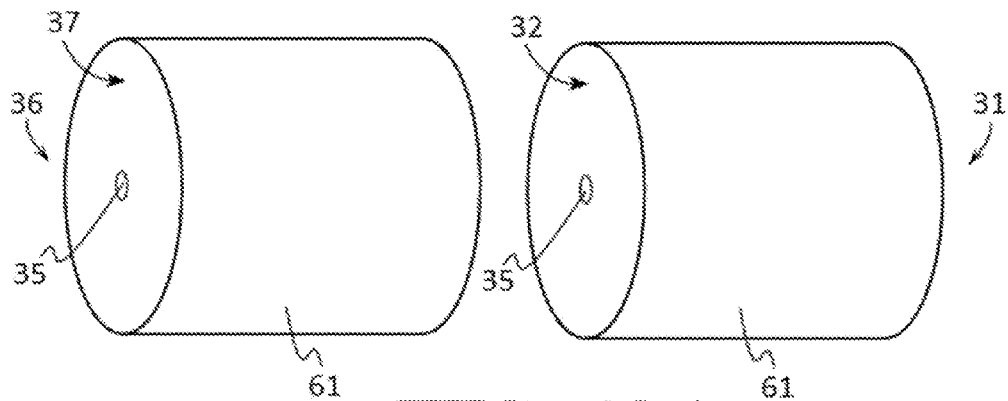
FIG. 12A shows an exemplary high-strength thermoplastic PAI material based pair of isolators which may be positioned within the metal web conduit and through which one conducting pin may be inserted through a single-sealing channel in the metal web conduit or formed into the conduit according to various embodiments described herein.
Figure 12B:
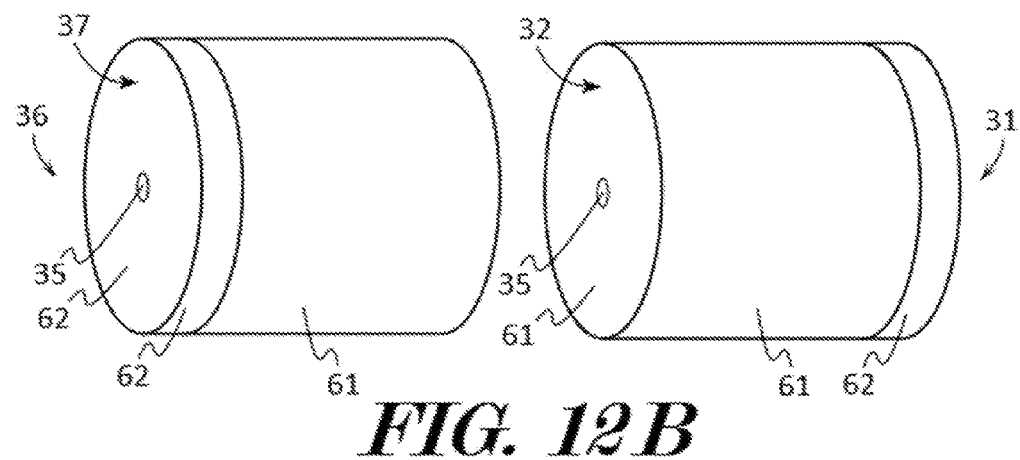
FIG. 12B illustrates another exemplary a nonpolar PEEK thermoplastic coated PAI material-based pair of isolators which may be positioned within the metal web conduit and through which one conducting pin may be inserted through a single-sealing channel in the metal web conduit or formed into the conduit according to various embodiments described herein.
Figure 12C:
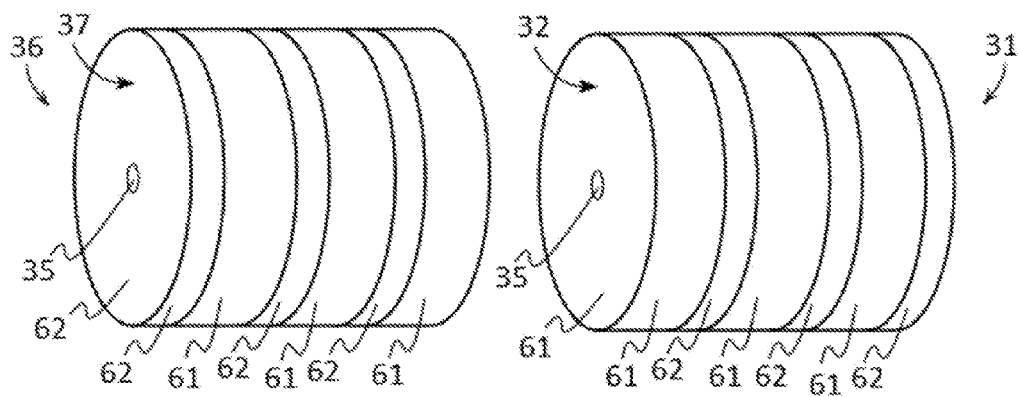
FIG. 12C depicts still another exemplary a PEEK and PAI alternative composition based pair of isolators which may be positioned within the metal web conduit and through which one conducting pin may be inserted through a single-sealing channel in the metal web conduit or formed into the conduit according to various embodiments described herein.
Figure 13:
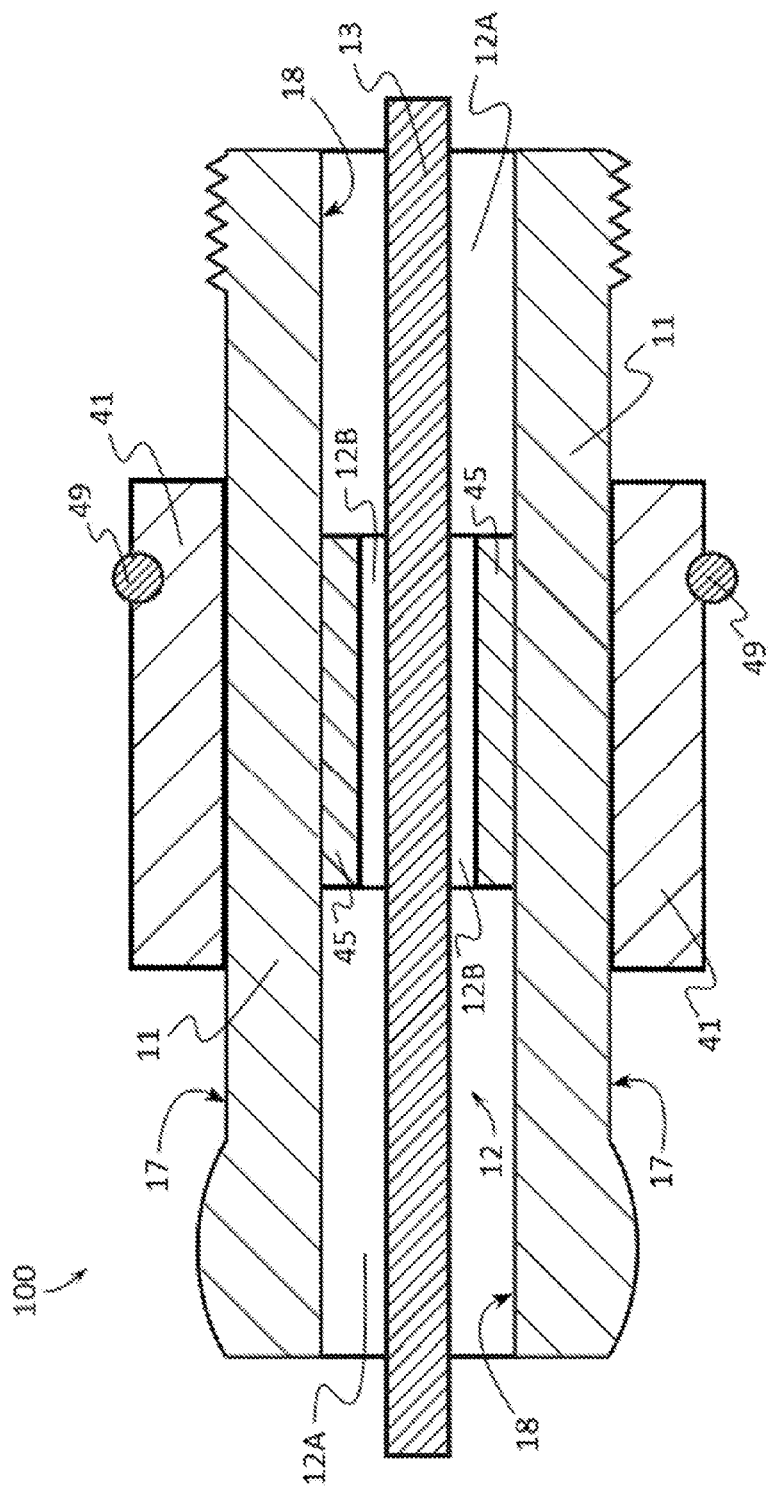
FIG. 13 shows a sectional elevation view of an example of a downhole electrical feedthrough package showing a conducting pin extending through a metal web conduit, sealed in a hybrid dielectric sealing material, according to various embodiments described herein.

FIGS. 11A-11C show exemplary material compositions for a first isolator 31 and a second isolator 36 which may be positioned within the metal web conduit 45 and through which multiple conducting pins 13 may be inserted through one or more sealing channels 35 or formed into according to various embodiments described herein, while FIGS. 12A-12C show exemplary material compositions for a first isolator and a second isolator which may be positioned within the metal web conduit 45 and through which one conducting pin may be inserted through one sealing channel 35 or formed into according to various embodiments described herein. In some embodiments, each isolator 31, 36 may comprise one or more isolator materials (thermoplastics) and each isolator material may have a coefficient of thermal expansion that may be different from the coefficient of thermal expansion of another isolator material. In further embodiments, each isolator 31, 36 may comprise one or more isolator materials (thermoplastics) and each isolator material may have a water absorption coefficient that may be smaller than another isolator material, for example, PTFE has <0.01% water absorption less than PEEK of 0.5% water absorption. In also further embodiments, each isolator 31, 36 may comprise one or more isolator materials (thermoplastics) and each isolator material may have a dielectric strength that may be better than another isolator material.

As shown in FIGS. 11A-12C, an isolator 31, 36 may be made from one or more materials, such as a first isolator material 61 and/or a second isolator material 62. A first isolator material 61 and second isolator material 62 may be any suitable electrically non-conductive material which may be used to form an isolator 31, 36. In some embodiments, a first isolator material 61 may be or comprise PAI thermoplastic and a second isolator material 62 may be or comprise PEEK thermoplastic, however the invention is not limited to these two materials and an isolator 31, 36 may be made from or comprise three or more isolator materials. In some embodiments, an isolator may comprise a thermoplastic, such as PEEK, PAI, or any engineered thermoplastic, with high-temperature (≥260 degree Celsius) and high tensile strength (≥14,000 PSI), and dielectric strength of ≥480 V/mil etc.) as downhole fluid blocker for isolating corrosive and conductive fluid from dielectric seal surfaces.

FIGS. 11A and 12A show an exemplary material composition for a first isolator 31 and a second isolator 36 which may be positioned symmetrically surrounding the metal web conduit 45 and through which one or more conducting pins 13 and sealing channel 35 through or formed into. In some embodiments, an isolator 31, 36 may be made from or comprise a single isolator material such as a first isolator material 61 which may be PAI thermoplastic.

FIGS. 11B and 12B show an exemplary material composition for a first isolator 31 and a second isolator 36 which may be positioned within the metal conduit 12 and through which one or more conducting pins may be inserted through or formed into. In some embodiments, an isolator 31, 36 may be made from or comprise two isolator materials such as a first isolator material 61 which may be PAI thermoplastic and a second isolator material 62 which may be PEEK thermoplastic. In this example, the first isolator material 61 may be disposed within the metal conduit 12 relatively closer to a dielectric seal 21, 26, while the second isolator material 62 may be disposed within the conduit 12 relatively closer to the first 71 and second 72 ends of the metal shell 11. By forming the second isolator material 62 with PEEK thermoplastic, the first isolator 31 may be configured with a first isolator distal surface 33 having a high CTE and the second isolator 36 may be configured with a second nonpolar surface 37 having a high CTE and the isolator may be configured with a high CTE coated thermoplastic material positioned in the conduit 12 closest to an end 71, 72, of the metal shell 11 for thermally removing downhole fluid deposited minerals, silicates and carbonates on the isolator distal surface 33, 38.

FIGS. 11C and 12C show an exemplary material composition for a first isolator 31 and a second isolator 36 which may be positioned within the metal conduit 12 and through which one or more conducting pins 13 and sealing channels 35 may be inserted through or formed into. In some embodiments, an isolator 31, 36, may be made from or comprise a two isolator materials such as a first isolator material 61 which may be PAI thermoplastic and a second isolator material 62 which may be PEEK thermoplastic which may be alternately layered upon each other. In this example, the isolators 31, 36 may comprise three alternating layers of isolator materials with a first isolator material 61 disposed within the metal conduit 12 relatively closer to a dielectric seal 21, 26, and a second isolator material 62 disposed within the metal conduit 12 relatively closer to the first 71 and second 72 ends. By forming the second isolator material 62 with PEEK thermoplastic, the first isolator 31 may be configured with a first isolator distal surface 33 having a high CTE and the second isolator 36 may be configured with a second nonpolar surface 37 having a high CTE and the isolator may be configured with a high CTE coated thermoplastic material positioned in the conduit 12 closest to an end 71, 72, of the metal shell 11 for thermally removing downhole fluid deposited minerals, silicates and carbonates on the isolator distal surface 33, 38. In further embodiments, an isolator 31, 36, may comprise two, four, five, six, or more alternating layers of isolator materials.

In some embodiments, an isolator 31, 36, can be made from or comprise PAI-based thermoplastic material which may be used to seal the first 71 and second 72 ends of the feedthrough package 100 with one or multiple conducting pins 13 penetrated through. In other embodiments, an isolator 31, 36, can be made from or comprise PEEK coated PAI material (as shown in FIG. 11B) where the relatively high CTE of 55-140 μm/m·K of PEEK material could enable the feedthrough package 100 to be self-cleaning by thermally removing downhole fluid contained mineral or carbonate deposits on or proximate to an isolator 31, 36. In still further embodiments, an isolator 31, 36, can be made from or comprise a mixing of PEEK and PAI materials (as shown in FIG. 11C) with high CTE PEEK material facing the first 71 and second 72 ends of the feedthrough package 100 and potential downhole fluid. Downhole fluids encountered by the feedthrough packages 100 may be corrosive fluids having a pH less than 5 or higher than 10, downhole fluid that contains electrical conductive ions, such as hydroxyl ($—OH^{-1}$), downhole fluid that contains minerals, silicates, and/or carbonates could introduce scaling or fouling inside the feedthrough package 100. Since the CTE of these minerals, silicates, and carbonates deposit may have relative lower CTE than the CTE of the thermoplastic based isolator(s) 31, 36, the thermal cycle endured by the feedthrough package 100 could induce shear stress (σ) for isolator self-cleaning by $$\sigma = (Y_{isolator} \cdot \alpha_{isolator} - Y_{scaling} \cdot \alpha_{scaling}) \cdot \Delta T, \quad (4)$$

where Y and α are Young's modulus and thermal expansion, and ΔT is relative temperature variation. The deposited scaling on the isolator surface can be removed when this shear stress is higher than the intrinsic bonding strength of the scaling material. As a fact that a nonpolar isolator surface has relative low surface energy that could strongly limit such a bonding strength from inorganic substances.

The feedthrough package 100 may be a single-pin 13 or multi-pin 13 package either as a bi-directional connector or as single-directional connector. In preferred embodiments, the feedthrough package 100 may comprise an Inconel alloy (718 or X750) based hollow cylinder-based metal shell 11, metal web conduit 45, Inconel alloy (X750)-based conducting pins 13, a pair of thermoplastic (PAI or PEEK) thermoplastic-based isolators 31, 36, having a generally hollow cylindrical shape, and a glass or glass-ceramic material dielectric seal 21, 26. Additionally, an exterior mechanical seal 49, such as a metal C-ring (such as made by Parker ESI) and threading 48 may be positioned on the outer surface 17 of the metal shell 11 which provides a first mechanical seal to prevent downhole fluid from permeation into the metal conduit 12; the pair of isolator 31, 36, hollow cylinders are not only used as vibration damper but also as second mechanical seal to block downhole fluid potentially leaked from a first seal failure; and a dielectric seal 21 is not only used as third mechanical seal but also as electrical seal to insulate the electrical transmissions from logging tool electronics to the wireline cable and surface instruments. Additionally, the installation flange 41 may be circumferentially attached to the central section of the outer surface 17 of the metal shell 11 either by welding process or bolt fastened attachment.

Figure 10:
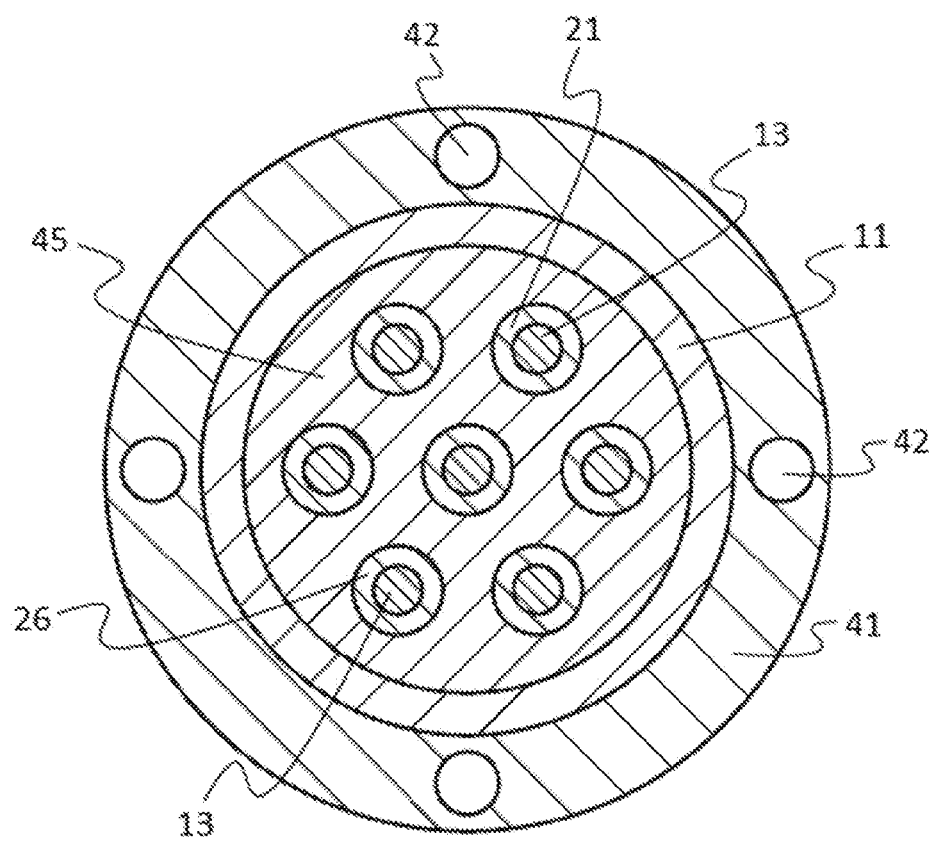
FIG. 10 depicts a sectional, through line C-C shown in FIG. 1, elevation view of a multiple conducting pin example of a downhole electrical feedthrough package with an installation flange for assisting downhole logging tool or bulkhead integration according to various embodiments described herein.

In further embodiments, the metal shell 11 may be an Inconel alloy material because of its resistance to corrosion especially from $H_2S$ and $CO_2$ rich downhole environment, which can prevent the gradual degradation of a feedthrough package's 100 mechanical strength from electrochemical reaction with the surrounding environment. The corrosion resistance of Inconel alloy is attributed to the thin passive layer that forms spontaneously on its surface in oxidizing environments if the metal material has a minimum chromium content of ~10.5%. Advantageously, Inconel alloy has a low coefficient of thermal expansion (CTE) of ~$12 \times 10^{-6}$ m/m per degree Celsius than stainless steel of ~$16 \times 10^{-6}$ m/m per degree Celsius that could effectively reduce CTE mismatch induced stress on the internal sealing material, which is critical for reducing package internal thermal stress against potential dielectric seal cracks. Referring to FIG. 10, the cross section of a multi-pin 13 electrical feedthrough package 100 has a circular shape with an installation flange 41 coupled to the outer surface 17 of the metal shell 11, and multiple pins 13 are embedded into a glass-ceramic matrix dielectric seal 21 with a sealing length (L1), which may be 3-5% shorter than the metal web thickness. To avoid any CTE mismatch between metal shell 11 and metal web conduit 45, a similar Inconel 718-based web 45 may be used for supporting multiple pins 13 embedded into a glass-ceramic dielectric seal 21. The initial dielectric seal 21 may be a sintered bead with hollow cylinder shape with its inner diameter a 2.0-2.5 times larger than the conducting pin 13 diameter, but its outer diameter is equal to sealing channel(s) 35 diameter. First, the dielectric seal 21 may function as a mechanical seal to isolate one-side environment (maybe high-pressure fluid) from the other side environment (maybe downhole tool inside electronics environment) to protect downhole tool from the harsh environment. The other critical function of the dielectric seal 21 may be to provide electrical insulation to isolate the electrical signal from the downhole logging tool enclosure to wireline cable and to surface instruments.

In further embodiments, a feedthrough package 100 may be mated with a receptacle in an and a mechanical seal between the feedthrough package 100 and receptacle could be controlled by the use of the different Inconel alloys with 718 as receptacle and X750 as the metal shell 11 of the feedthrough package 100. The thermo-mechanical stress will be controlled in the range of >−250 MPa at −40 degrees Celsius to <−50 MPa at +300 degrees Celsius by their slight different coefficients of thermal expansion mismatch and geometrical parameters, such as outer and inner diameter of the metal shell 11, sealing length, and conducting pin 13-to-conducting pin 13 distance, etc.

Figure 2:
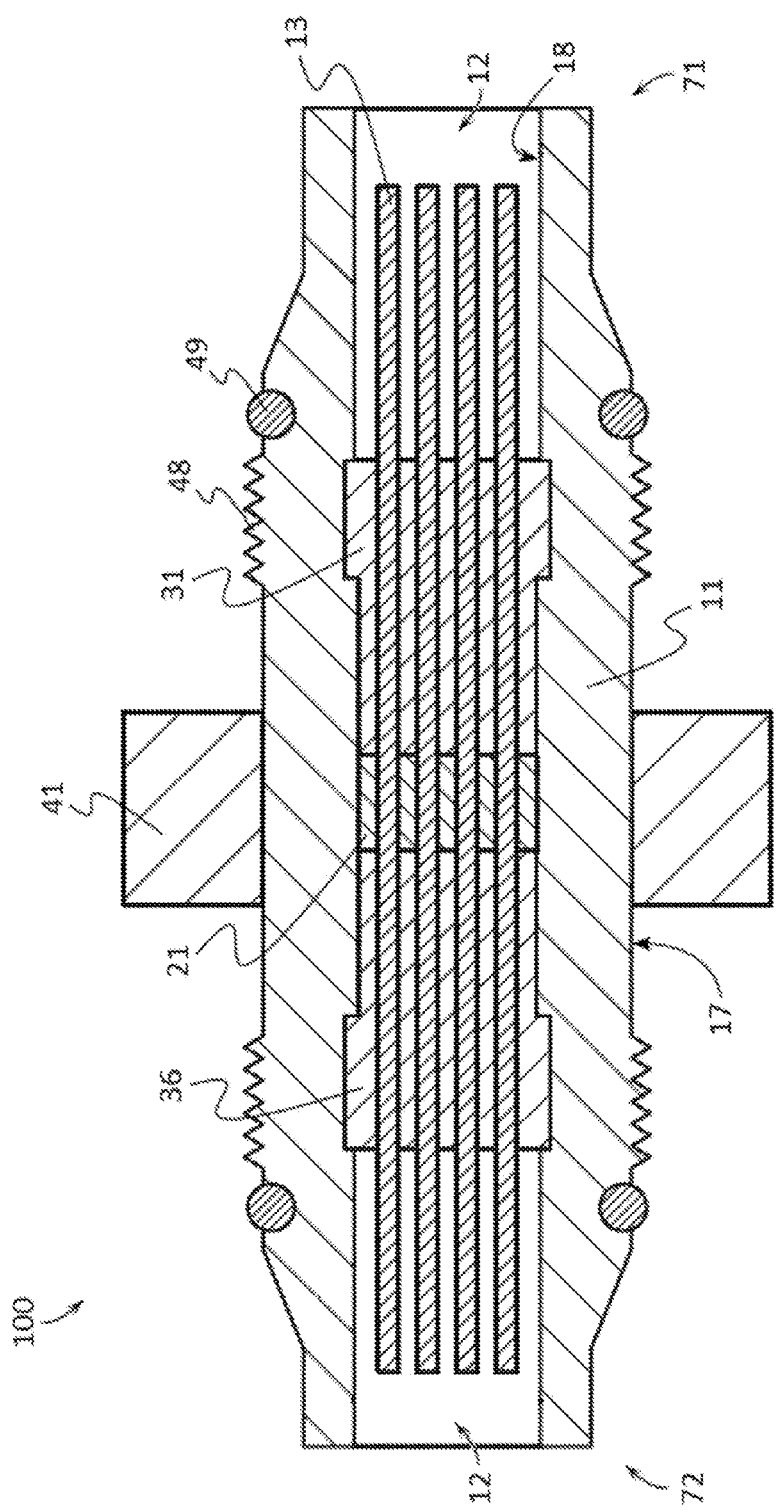
FIG. 2 illustrates a sectional, through line A-A shown in FIG. 1, elevation view of a multiple conducting pin example of a bi-directional downhole electrical feedthrough package according to various embodiments described herein.

An example multiple conducting pin 13 feedthrough package 100 is shown in FIG. 2, and an example single conducting pin 13 feedthrough package 100 is shown in FIG. 3 each having a pair of isolators 31, 36, symmetrically surrounding a dielectric seal 21 in the metal conduit 12. In these and some embodiments, the feedthrough package 100 may be configured as a bi-directional connector based feedthrough design. The feedthrough 100 may comprise one or more conducting pins 13 extending through the metal web conduit 45 formed by the inner surface 18 of the metal shell 11. A first dielectric seal 21, having a first central surface 22 and a first peripheral surface 23, may surround a portion of the conducting pin(s) 13 and electrically isolate the conducting pin(s) 13 from the metal shell 11. A first isolator 31 may be disposed within the metal conduit 12 and may symmetrically surround the sealing channel(s) 35. The first isolator 31 may have a first nonpolar surface 32 positioned proximate to the peripheral surface 23 of the dielectric seal 21. A second isolator 36 may also be disposed within the metal conduit 12 and may also symmetrically surround the sealing channel(s) 35. The second isolator 36 may have a second isolator distal surface 38 positioned proximate to the central surface 22 of the dielectric seal 21. A flange 41 may encircle the section of the metal shell 11 that contains the dielectric seal 21. A set of threading 48 and an exterior mechanical seal 49 may be positioned on each side of the flange 41.

Figure 5:
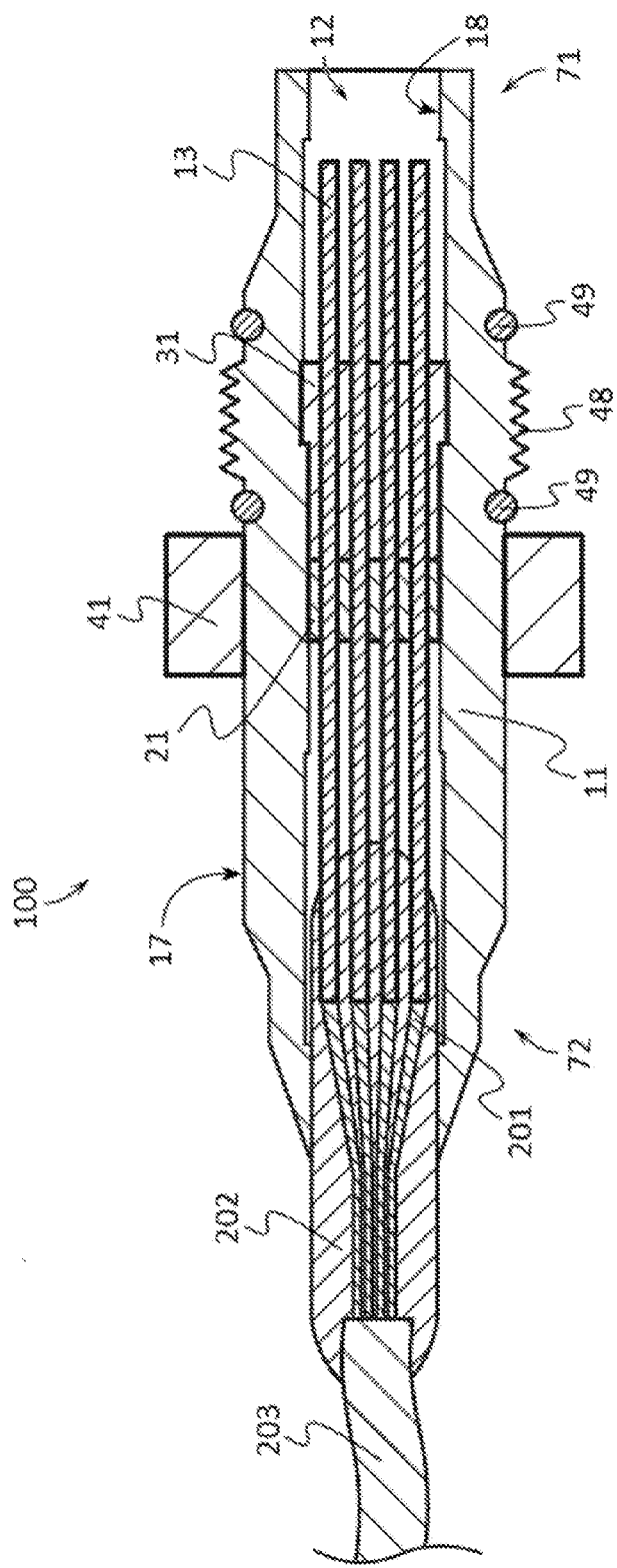
FIG. 5 illustrates a sectional, through line B-B shown in FIG. 4, elevation view of a multiple conducting pin example of a single-directional downhole electrical feedthrough package according to various embodiments described herein.
Figure 6:
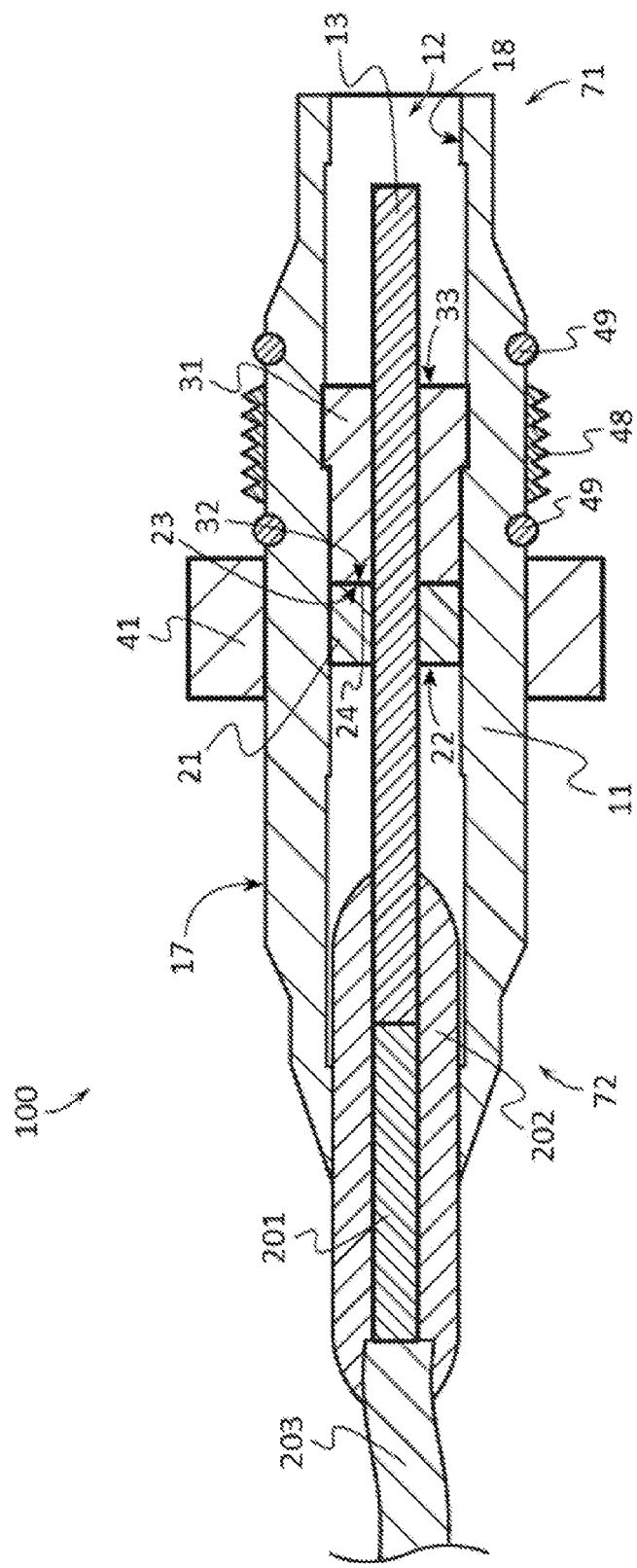
FIG. 6 shows a sectional, through line B-B shown in FIG. 4, elevation view of a single conducting pin example of a single-directional downhole electrical feedthrough package according to various embodiments described herein.

An example multiple conducting pin 13 feedthrough package 100 is shown in FIG. 5, and an example single conducting pin 13 feedthrough package 100 is shown in FIG. 6 each having a isolator 31 positioned proximate to a dielectric seal 21 in the metal conduit 12. In these and some embodiments, the feedthrough package 100 may be configured as a single-directional connector based feedthrough design. The feedthrough package 100 may comprise one or more conducting pins 13 extending through the metal conduit 12 formed by the inner surface 18 of the metal shell 11. A first dielectric seal 21, having a first central surface 22 and a first peripheral surface 23, may surround a portion of the conducting pin(s) 13 and electrically isolate the conducting pin(s) 13 from the metal shell 11. A first isolator 31 may be disposed within the conduit 12 and may surround a portion of the conducting pin(s) 13. The first isolator 31 may have a first nonpolar surface 32 positioned proximate to the peripheral surface 23 of the dielectric seal 21. A flange 41 may encircle the section of the metal shell 11 that contains the dielectric seal 21. A set of threading 48 may be positioned on the outer surface 17 and an exterior mechanical seal 49 may be positioned on each side of the threading 48. An electrical wire(s) 201 may be coupled to the conducting pin(s) 13 and a sealing boot 202 and insulating cable 203 may be used to insulate the electrical wire(s) 201.

Figure 7:
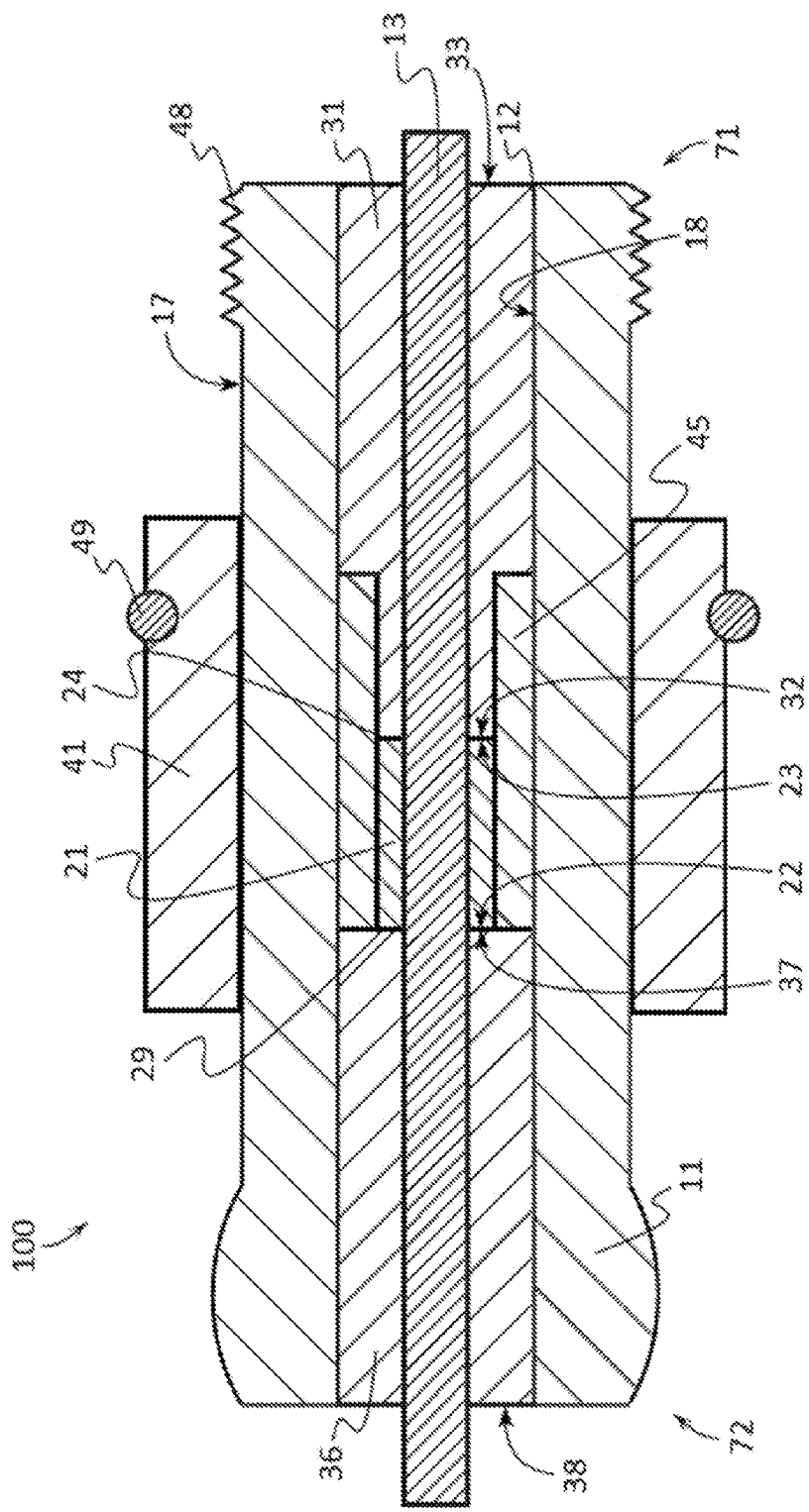
FIG. 7 depicts a sectional elevation view of another example of a single conducting pin bi-directional downhole electrical feedthrough package according to various embodiments described herein.

In further embodiments and as shown in FIGS. 7-9, a feedthrough package 100 may comprise two isolators 31, 36, which may be configured as cylinders, positioned approximately symmetrically surrounding one or more dielectric seals 21, 26, and optional ceramic sleeves 51 thereby providing two functions. Firstly, the isolators 31, 36, may function as vibration dampers, because the thermoplastic material is compressed by metal shell 11 in ambient conditions, and downhole temperatures will increase this compression because high thermal expansion in thermoplastic material (30-70$\times 10^{-6}$ m/m·K) than metal shell 11 (~$12 \times 10^{-6}$ m/m·K). Secondly, the isolators 31, 36, on both sides of the sealing material (one or more dielectric seals 21, 26, and optional ceramic sleeves 51) will damper mechanical shock induced deformation and mitigate conducting pin 13 bending by the compression stress in the isolators 31, 36.

An alternative example of a single conducting pin 13 feedthrough package 100 having two isolators 31, 36, positioned proximate to a dielectric seal 21 in the metal conduit 12 is shown in FIG. 7. In this and some embodiments, the feedthrough package 100 may comprise a metal web conduit 45 positioned within the metal conduit 12. One or more conducting pins 13 may extend through the metal web conduit 45 and the metal conduit 12 formed by the inner surface 18 of the metal shell 11. A dielectric seal 21, having a first central surface 22 and a first peripheral surface 23, may surround a portion of the conducting pin(s) 13 and electrically isolate the conducting pin(s) 13 from the metal web conduit 45 and therefore from the metal shell 11. A first isolator 31 may be disposed within the metal conduit 12 and may symmetrically surround the sealing channel(s) 35. Additionally, the first isolator 31 may extend into the metal web conduit 45 and symmetrically surround the sealing channel(s) 35 within the metal web conduit 45. The first isolator 31 may have a first nonpolar surface 32 positioned proximate to the peripheral surface 23 of the dielectric seal 21. A flange 41 may encircle the section of the metal shell 11 that contains the dielectric seal 21. A set of threading 48 and an exterior mechanical seal 49 may be positioned on the outer surface 17. Each isolator 31, 36 may be in hermetical contact with the inner surface 18 of the metal shell 11. A second isolator 36 may also be disposed within the metal conduit 12 and may also symmetrically surround the sealing channel(s) 35. The second isolator 36 may have a second isolator distal surface 38 positioned proximate to the central surface 22 of the dielectric seal 21. In use, preferably the feedthrough package 100 may be oriented so that the second isolator 36 is subjected to higher pressures than the first isolator 31.

Furthermore, FIG. 7 depicts asymmetrical isolators 31, 36, because the non-pressure side may experience manual plug in and de-plug mechanical operations that all too frequently may bend the pin 13. A short sectional length of isolator 31, 36, inside the conduit 12 traversing the metal web conduit 45 provides better mechanism to prevent the pin 13 from mechanical bending that is normally a failure mode of cracking the typically brittle sealing material (one or more dielectric seals 21, 26, and optional ceramic sleeves 51.

The feedthrough package 100 may comprise one or more ceramic sleeves 51 as perhaps best shown in FIGS. 8 and 9. In some embodiments, a ceramic sleeve 51 may be used to provide extra reinforcement for avoiding conducting pin 13 bending induced cracks in a dielectric seal 21 and also to provide good electrical insulation between a conducting pin 13 and a metal shell 11 and/or metal web conduit 45. Optionally, a ceramic sleeve 51 may not be hermetically sealed to a conducting pin 13, metal web conduit 45, and/or metal shell 11, so that the loosed ceramic sleeve 51 will stop cracking propagation from one side of a dielectric seal 21, 26, to the other side. Thus, if one side of a dielectric seal 21, 26, failed mechanically by incidently mechanical shock event, the other side may still electrically insulate normally without causing electrical shorting between a conducting pin 13 contained within and the metal shell 11. In further embodiments, a ceramic sleeve 51 may comprise or be formed from any fine ceramics (also known as "advanced ceramics") that do not conduct electricity and which preferably have resistance to acid, alkali, organic solvents, and/or water, including higher strength ceramic material such as a cerium oxide, zirconia, alumina, and silicon nitride.

A further alternative example of a single conducting pin 13 feedthrough package 100 having two isolators 31, 36, each positioned in the metal conduit 12 and each symmetrically surrounding the sealing channel 35 is shown in FIG. 8. In this and some embodiments, the feedthrough package 100 may comprise a metal web conduit 45 positioned within the metal conduit 12. Additionally, one or more conducting pins 13 may extend through the metal web conduit 45, the sealing channel(s) 35 and the metal conduit 12 formed by the inner surface 18 of the metal shell 11. A dielectric seal 21, having a first central surface 22 and a first peripheral surface 23, may surround a portion of the conducting pin(s) 13 and electrically isolate the conducting pin(s) 13 from the metal web conduit 45 and therefore from the metal shell 11. A ceramic sleeve 51 may also be disposed within the metal conduit 12, such as in the metal web conduit 45, and the ceramic sleeve 51 may also surround a portion of the conducting pin 13 and electrically isolate the conducting pin(s) 13 from the metal web conduit 45 and therefore from the metal shell 11. The isolator first nonpolar surface 32 may be formed by a thermoplastic material having a high CTE, such as PEEK, of one of the isolators 31 may be positioned proximate to the ceramic sleeve 51, and the isolator distal surface 38 may be formed by a thermoplastic material having a high CTE, such as PEEK, of the other isolator 36 may be positioned proximate to the central surface 22 of the dielectric seal 21 while the ceramic sleeve 51 may be positioned proximate to the peripheral surface 23 of the dielectric seal 21. In this manner, the ceramic sleeve 51 and dielectric seal 21 may be positioned proximate to each other while they are both positioned between the isolators 31, 36. A flange 41 may encircle the section of the metal shell 11 that contains the dielectric seal 21 and the ceramic sleeve 51. Each isolator 31, 36 may be in hermetical contact with the inner surface 18 of the metal shell 11. In use, preferably the feedthrough package 100 may be oriented so that the side of the metal conduit 12 closest to the dielectric seal 21 is subjected to higher pressures than the side of the metal conduit 12 closest to the ceramic sleeve 51.

Still a further alternative example of a single conducting pin 13 feedthrough package 100 having two isolators 31, 36, each positioned in the metal conduit 12 and each surrounding a portion of the conducting pin(s) 13 and symmetrically surrounding the sealing channel(s) 35 is shown in FIG. 9. In this and some embodiments, the feedthrough package 100 may comprise a metal web conduit 45 positioned within the conduit 12. Additionally, one or more conducting pins 13 may extend through the metal web conduit 45 and the conduit 12 formed by the inner surface 18 of the metal shell 11. Two dielectric seals 21, 26, each having a central surface 22, 27 and a peripheral surface 23, 28, may each surround a portion of the conducting pin(s) 13 and electrically isolate the conducting pin(s) 13 from the metal web conduit 45 and therefore from the metal shell 11. A ceramic sleeve 51 may also be disposed within the conduit 12, such as in the metal web conduit 45, and the ceramic sleeve 51 may also surround a portion of the conducting pin 13 and symmetrically surrounding the sealing channel(s) 35 and electrically isolate the conducting pin(s) 13 from the metal web conduit 45 and therefore from the metal shell 11. The ceramic sleeve 51 may be positioned within the metal conduit 12 between the two dielectric seals 21, 26, and the first isolator 31 may be positioned proximate to the first dielectric seal 21 while the second isolator 36 may be positioned proximate to the second dielectric seal 26. The first nonpolar surface 32 of the first isolator 31 may be positioned proximate to the first peripheral surface 23 of the first dielectric seal 21, and the second distal surface 38 of the second isolator 36 may be positioned proximate to the first central surface 22 of the first dielectric seal 21. In this manner, the first dielectric seal 21 and second dielectric seal 26 may be separated by a ceramic sleeve 51 while all three 21, 26, 51, are positioned between the isolators 31, 36. A flange 41 may encircle the section of the metal shell 11 that contains the dielectric seals 21, 26, and the ceramic sleeve 51. Each isolator 31, 36 may be in hermetical contact with the inner surface 18 of the metal shell 11. In use, preferably the feedthrough 100 may sustain elevated pressures on both ends 71, 72, of the metal shell 11.

FIG. 13 shows a sectional elevation view of still another example of a single conducting pin bi-directional downhole electrical feedthrough package 100 according to various embodiments described herein. In some embodiments, the feedthrough package 100 may comprise a metal shell 11 having a metal web conduit 45 disposed within the metal shell 11. A metal conduit 12 may extend through the metal shell 11 and metal web conduit 45, which includes a sealing channel 35. As an example only one conducting pin 13 may be disposed in the sealing channel. A dielectric seal 21 may electrically isolate the conducting pin(s) 13 from the metal web conduit 45, the dielectric seal having a central surface 22 and a peripheral surface 23. This feedthrough package has no isolator or isolators that are designed for used in less harsh environment, especially without corrosive fluids involved applications.

Figure 14:
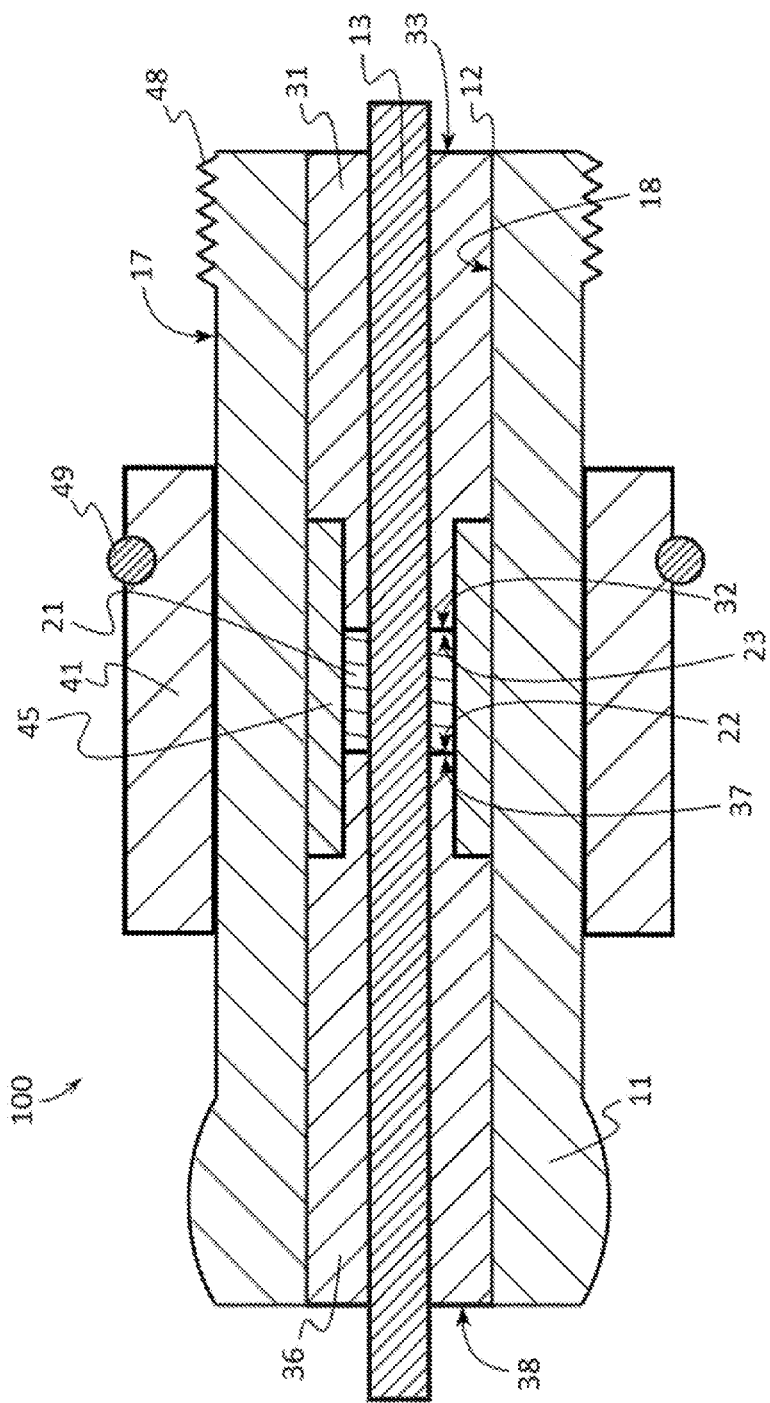
FIG. 14 shows a sectional elevation view of still another example of a single conducting pin bi-directional downhole electrical feedthrough package showing a conducting pin extending through a metal web conduit, sealed by a hybrid dielectric sealing material, according to various embodiments described herein.

FIG. 14 shows a sectional elevation view of still another example of a single conducting pin bi-directional downhole electrical feedthrough package 100 according to various embodiments described herein. In some embodiments, the feedthrough package 100 may comprise a metal shell 11 having a metal web conduit 45 disposed within the metal shell 11. A metal conduit 12 may extend through the metal shell 11 and metal web conduit 45, which includes a sealing channel 35. As an example only one conducting pin 13 may be disposed in the sealing channel. A dielectric seal 21 may electrically isolate the conducting pin(s) 13 from the metal web conduit 45, the dielectric seal having a central surface 22 and a peripheral surface 23. One or more isolators, such as a first isolator 31 and a second isolator 36, may be disposed within the conduit 12 and may symmetrically surround the sealing channel, the isolators 31, 36, having a nonpolar surface 32, 37, positioned proximate to the at least one of the surfaces 22, 23, of the dielectric seal 21. The dielectric seal comprises glass-to-metal seal in the middle sealing channel and isolator seal in the two sides of the sealing channel, where the isolator is made from low water absorption thermoplastic material, such as PTFE (<0.01% 24 hr water immersion test) or PFA (<0.03% 24 hr water immersion test). This hybrid dielectric seal can be seen below:

While some materials have been provided, in other embodiments, the elements that comprise the feedthrough package 100 may be made from durable materials such as steel, other metals and metal alloys, carbon fiber or glass fiber reinforced resins and thermoplastics or any other suitable thermoset materials including combinations of materials. Additionally, one or more elements may be made from or comprise durable and slightly flexible materials such as high strength thermoplastics, or any other suitable thermoset materials including combinations of materials. In some embodiments, one or more of the elements that comprise the feedthrough package 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the feedthrough package 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the feedthrough package 100 may be coupled by being one of connected to and integrally formed with another element of the feedthrough package 100.

In some embodiments, the feedthrough package 100 may have at least one glass-to-metal seal (formed by a dielectric seal 21, 26, being hermetically coupled to the metal shell 11 and/or metal web conduit 45) for being configured as a single-directional interconnector or a pair of glass-to-metal seals (formed by two dielectric seals 21, 26, each being hermetically coupled to the metal shell 11 and/or metal web conduit 45) for being configured as a bi-directional interconnector, which provide both mechanical and electrical seal functions. In further embodiments, the mechanical seal of a glass-to-metal seal may be of high CTE mismatched metal shell 11 material to glass material or glass-ceramic material, where a compression stress of ~−200 MPa to −50 MPa is required in the temperature range from −40° C. to 300° C. with a high strength glass material or high strength glass-ceramic material that has approximately 350 MPa to 500 MPa compression strength. In still further embodiments, the glass-to-metal seal is of high insulation strength, where the electrical resistivity of the glass or glass-ceramic sealing material ranges from $1.0 \times 10^{10}$ to $1.0 \times 10^{15}$ Ω-cm. In still further embodiments, the glass or glass-ceramic sealing material has moisture resistant property against potential moisture leak passing from conducting pin(s) 13.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An integrated downhole electrical feedthrough package, the integrated downhole feedthrough package comprising:
   a metal shell comprising a metal web with metal web conduit, wherein the metal shell and metal web have a first coefficient of thermal expansion;
   a conducting pin disposed in a sealing channel and the metal web conduit, wherein the conducting pin has second coefficient of thermal expansion;
   a dielectric seal electrically isolating the conducting pin from the metal web conduit, the dielectric seal selected from one of a glass-ceramic seal and a hybrid seal with nonpolar thermoplastic, wherein the dielectric seal has a third coefficient of thermal expansion;
   a pair of isolators disposed within the metal shell and symmetrically surrounding the dielectric seal, wherein each isolator of the pair of isolators comprises a nonpolar surface positioned proximate to a peripheral surface of the dielectric seal, wherein the pair of isolators have a fourth coefficient of thermal expansion; and wherein the fourth coefficient of thermal expansion is at least 2 times greater than the first coefficient of thermal expansion.

2. The feedthrough package of claim 1, wherein the dielectric seal provides mechanical isolation for preventing downhole moisture from passing through the metal web conduit.

3. The feedthrough package of claim 1, wherein the dielectric seal comprises a water insoluble glass oxide having a glass transition temperature ranging from 350 degrees Celsius to 500 degrees Celsius.

4. The feedthrough package of claim 1, wherein the dielectric seal has less than 0.001% moisture absorption preventing moisture from passing through the metal web conduit.

5. The feedthrough package of claim 1, wherein tensile thermal-mechanical stresses in the metal shell and the metal web conduit are 2-4 times lower than maximum allowable stress of the metal shell and the metal web conduit and compressive thermo-mechanical stresses in the dielectric seal are 2-4 times lower than maximum compression stress of a dielectric sealing material.

6. The feedthrough package of claim 1, wherein there is a CTE mismatch between the metal shell and the metal web conduit and the dielectric seal, and wherein a ratio of a dielectric seal outer diameter over a conducting pin diameter ranges from 2.5 to 3.0, and a sealing length L ranges from 2.5 to 3.0 times of the dielectric seal outer diameter for ensuring optimum thermo-mechanical stress amplitude in a range of −40 degrees Celsius to 300 degrees Celsius.

7. The feedthrough package of claim 1, wherein the metal shell comprises a metal selected from the group consisting essentially of; titanium, stainless steel alloy (304LSS,Nitronic), Inconel alloy, and any other alloys with a minimum chromium content substantially of 10.5%.

8. The feedthrough package of claim 1, wherein an isolator comprises nonpolar thermoplastic with high-operating-temperature (≥260 degree Celsius), and dielectric strength (≥23) and high coefficient of thermal expansion (>35×10$^{-6}$ m/m·K) as downhole fluid blocker for mechanically isolating corrosive and conductive fluid from a dielectric seal surface.

9. The feedthrough package of claim 1, wherein the pair of isolators further comprise high compression strength (≥18,000 PSI) thermoplastic or thermoset materials as a vibration dampeners for preventing a sealing material of the dielectric seal from cracks from field mishandling and installation related mechanical shock.

10. The feedthrough package of claim 1, wherein the pair of isolators further comprise a thermoplastic material positioned in the metal web conduit closest to an end of the metal shell for thermally removing downhole fluid deposited minerals, silicates, and carbonates on a first isolator surface.

11. The feedthrough package of claim 1, further comprising an installation flange that encircles a section of the feedthrough package for preventing sealing material cracks.

12. An integrated downhole electrical feedthrough package, the feedthrough package comprising:
a metal shell housing a metal web with a metal web conduit, wherein the metal shell and the metal web have a first coefficient of thermal expansion;
a conducting pin disposed in a sealing channel;
a dielectric seal electrically isolating the conducting pin from the metal web conduit, the dielectric seal comprising at least one of a glass-ceramic or hybrid seal with nonpolar thermoplastic, wherein the dielectric seal has a third coefficient of thermal expansion;
a first isolator disposed within the metal shell and surrounding a portion of the conducting pin, the first isolator having a nonpolar surface positioned proximate to a peripheral surface of the dielectric seal, wherein the first isolator is made from a thermoplastic having a fourth coefficient of thermal expansion; and
wherein the fourth coefficient of thermal expansion is at least 2 times greater than the first coefficient of thermal expansion.

13. The feedthrough package of claim 12, further comprising a second isolator disposed within the metal shell and surrounding a portion of the conducting pin, the second isolator having a second nonpolar surface positioned proximate to a central surface of the dielectric seal, wherein the second isolator is made from a thermoplastic having a fourth coefficient of thermal expansion, wherein the isolator is positioned proximate to the dielectric seal, and wherein the isolator functions as an elastic cushion to damp external incidentally vibration.

14. The feedthrough package of claim 12, wherein the dielectric seal is formed by a dielectric sealing material, wherein tensile thermal-mechanical stresses on the metal shell are 2-4 times lower than maximum allowable stress of the metal shell and the metal web conduit and compressive thermo-mechanical stresses in the dielectric seal are 2-4 times lower than maximum compression stress of the dielectric sealing material.

15. The feedthrough package of claim 13, wherein the isolator functions as a mechanical barrier to prevent a potential leak of downhole corrosive fluids from contacting the dielectric seal.

16. The feedthrough package of claim 13, further comprising a ceramic sleeve disposed within the metal web conduit and surrounding a portion of the conducting pin, the ceramic sleeve positioned between the dielectric seal and the second isolator.

17. The feedthrough package of claim 13, further comprising a first dielectric seal and a second dielectric seal separated by a ceramic sleeve, wherein the first isolator is positioned proximate to the first dielectric seal, wherein the second isolator is positioned proximate to the second dielectric seal, and wherein the first dielectric seal, second dielectric seal, ceramic sleeve, first isolator, and second isolator each are disposed within the metal web conduit and surrounding a portion of the conducting pin.

* * * * *